(12) United States Patent
Brand

(10) Patent No.: US 6,735,566 B1
(45) Date of Patent: May 11, 2004

(54) GENERATING REALISTIC FACIAL ANIMATION FROM SPEECH

(75) Inventor: Matthew E. Brand, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/169,339

(22) Filed: Oct. 9, 1998

(51) Int. Cl.⁷ .................. G10L 15/14; G10L 21/00; G06T 15/70
(52) U.S. Cl. .................. 704/256; 704/270; 345/473
(58) Field of Search .................. 704/270, 276, 704/256, 235, 258; 345/473

(56) References Cited

U.S. PATENT DOCUMENTS

| | | | |
|---|---|---|---|
| 5,657,426 A | 8/1997 | Waters et al. | 704/276 |
| 5,933,151 A * | 8/1999 | Jayant et al. | 345/473 |
| 6,067,095 A * | 5/2000 | Danieli | 345/473 |
| 6,232,965 B1 * | 5/2001 | Scott et al. | 345/473 |

OTHER PUBLICATIONS

Rao et al, "Using HMMs in Audio–to–Visual Conversion", IEEE First Workshop on Multimedia Signal Processing, pp. 19–24, 1997.*

Masuko et al., "Text–to–Visual Speech Synthesis Based on Parameter Generation From HMM", Proc. ICASSP '98, pp. 3745–3748, vol. 6, May 1998.*

Rao et al, "Using HMMs in Audio–to–Visual Conversion", IEEE First Workshop on Mulitmedia Signal Processing, pp. 19–24, 1997.*

Masuko et al., "Text–to–Visual Speech Synthesis Based on Parameter Generation From HMM", Proc. ICASSP '98, pp. 3745–3748, vol. 6, May 1998.*

Tamura et al.; "Visual Speech Synthesis Based on Parameter Generation from HMM: Speech–Driven and Text–and–Speech–Driven Approaches"; Dec. 1998.

* cited by examiner

Primary Examiner—Richemond Dorvil
Assistant Examiner—Angela Armstrong
(74) Attorney, Agent, or Firm—Dirk Brinkman; Andrew Curtin

(57) ABSTRACT

A system for learning a mapping between time-varying signals is used to drive facial animation directly from speech, without laborious voice track analysis. The system learns dynamical models of facial and vocal action from observations of a face and the facial gestures made while speaking. Instead of depending on heuristic intermediate representations such as phonemes or visemes, the system trains hidden Markov models to obtain its own optimal representation of vocal and facial action. An entropy-minimizing training technique using an entropic prior ensures that these models contain sufficient dynamical information to synthesize realistic facial motion to accompany new vocal performances. In addition, they can make optimal use of context to handle ambiguity and relatively long-lasting facial co-articulation effects. The output of the system is a sequence of facial control parameters suitable for driving a variety of different kinds of animation ranging from warped photorealistic images to 3D cartoon characters.

31 Claims, 3 Drawing Sheets

GENERATING REALISTIC FACIAL ANIMATION FROM SPEECH

FIELD OF THE INVENTION

This invention relates to animation and more particularly to a system for giving an animated figure lifelike voice-controlled facial animation without time consuming production.

BACKGROUND OF THE INVENTION

From lip-synching to animation, psychologists and storytellers alike have observed that there is a good deal of mutual information between vocal and facial gestures. As discussed in an article by C. Benoit, C. Abry, M.-A. Cathiard, T. Guiard-Marigny, and T. Lallouache, Read my lips: Where? How? When? And so . . . What? In 8th Int. Congress on Event Perception and Action, Marseille, France, July 1995, Springer-Verlag, facial information can add significantly to the observer's comprehension of the formal and emotional content of speech, and is considered by some a necessary ingredient of successful speech-based interfaces. Conversely, the difficulty of synthesizing believable faces is a widely-noted obstacle to producing acceptable digital avatars, agents, and animation. The human visual system is highly specialized for interpreting facial action. As a result, a poorly animated face can be disturbing and even can interfere with the comprehension of speech as discussed by H. McGurk and J. MacDonald. Hearing lips and seeing voices, Nature, 264:746–748, 1976.

Lip-synching, a large part of facial animation, is a laborious process in which the voice track is dissected, usually by hand, features such as stops and vowels are identified, and matching face poses are scheduled in the animation track at 2–10 per second. The overwhelming majority of lip-synching research and all such commercial offerings are based on an intermediate phonemic representation, whether obtained by hand as discussed by F. Parke, A parametric model for human faces, Technical Report UTEC-CSc-75-047, University of Utah, 1974; F. Parke, A model for human faces that allows speech synchronized animation, Journal of Computers and Graphics, 1(1):1–4, 1975; Cohen and D. Massaro, Modeling co-articulation in synthetic visual speech, N. M. Thalmann and D. Thalmann, editors, Models and Techniques in Computer Animation, Springer-Verlag, 1993; T. Ezzat and T. Poggio, Miketalk: A talking facial display based on morphing visernes, Proc. of The Computer Animation Conference, June 1998; J. E. Ball and D. T. Ling, Spoken language processing in the persona conversational assistant, ESCA Workshop on Spoken Dialogue Systems, 1995; and I. Katunobu and O. Hasegawa, An active multi-model interaction system, ESCA Workshop on Spoken Dialogue Systems, 1995, other commercial offerings are based on speech recognition as discussed by J. Lewis, Automated lip-sync: Background and techniques, The Journal of Visualization and Computer Animation, 2:118–122, 1991; K. Waters and T. Levergood, Decface: A system for synthetic face applications. Multimedia Tools and Applications, 1:349–366, 1995; and C. Bregler, M. Covell, and M. Slaney, Video rewrite: Driving visual speech with audio, Proc. ACM SIGGRAPH 97, 1997. Visernes are mouth poses thought to occur commonly in speech.

Typically, phonemic or visemic tokens are mapped directly to lip poses, ignoring dynamical factors. In Video Rewrite, as discussed by the above-mentioned Bregler et al. article, vocal, but not facial, co-articulation is partially modeled via triphones, while Baldy as discussed by the above-mentioned Cohen et al. article, uses an explicit, but heuristic co-articulatory model derived from the psychological literature. Co-articulation is interaction between nearby speech segments that have observable effects on the acoustic signal and facial action. For example, one might shape a vowel differently in anticipation of the next vowel one plans to produce.

Phonemic and visemic representations are arguably a suboptimal representation of the information common to voice and face, since they obliterate the relationships between vocal prosody and upper facial gesture, and between vocal and gesture energy. Moreover, there is inherent information loss in the discretization to phonemes.

Attempts to generate lip poses directly from the audio signal have been limited to predicting vowel shapes and ignoring temporal effects such as co-articulation.

None of these methods address the actual dynamics of the face. For example, there is co-articulation at multiple timescales, 300 ms or less in the vocal apparatus and longer on the face. Furthermore, as noted in the above-mentioned Benoit et al. article, there is evidence found that lips alone convey less than half of the visual information that human subjects can use to disambiguate noisy speech. It has been found that much of the expressive and emotional content of facial gesture happens in the upper half of the face and this is not at all addressed by speech-oriented facial animation.

SUMMARY OF THE INVENTION

In order to provide a more realistic voice driven animation without animation voice track dissection, in the subject invention a more direct mapping from voice to face is used which involves learning a model of the face's natural dynamics during speech, then learning a mapping from vocal patterns to facial motion trajectories. An entropy-minimization technique permits learning without having to prespecify what one is to look for, with entropy being a measure of ambiguity. Note that, the hidden Markov models are used to analyze facial and vocal action and to predict how an animated version of the speaker's head should behave. Because of the use of hidden Markov models, the subject process takes minutes, not months to produce realistic lifelike animation sequences.

This method has several important properties. First, voice is analyzed with regard to learned categories of facial gesture, rather than with regard to hypothesized categories of speech perception. Secondly, long-term dependencies such as facial co-articulations are implicitly modeled. Thirdly, a probabilistic framework allows one to find the most probable face trajectory through a sequence of facial images used in producing the animation for a whole utterance, not just for a small window of time. Finally, the output of the system is at sequence of facial control parameters that can be used to drive model-based or image-based face animations.

In one embodiment, a database of synchronized speech and video is used as the starting point. The system then models facial dynamics with a hidden Markov model. The hidden Markov model is then split into two parts: a finite state machine which models the face's qualitative dynamics, e.g., expression to expression transition probabilities; and a set of Gaussian distributions that associate regions of facial configuration space to those states. The system then learns a second set of distributions from regions of vocal configuration space to the states occupied by the face at the same time. This combines with the facial dynamical model to become a newer hidden Markov model that is used to analyze new voice-tracks. The result is similar to a speech recognition engine, but instead of giving a most probable sequence of phonemes, the system provides a most probable sequence of facial states, using context from the full utterance for disambiguation when necessary. Using this sequence of facial states and the original set of facial output distributions, the system solves for a maximally probable trajectory through the facial states of the facial configuration space. Every possible facial expression is a point in facial configuration space. The maximally probable trajectory through this space is a sequence of expressions that best matches the target vocal track. The trajectory is then used to drive the animation.

Two features of the subject invention make this workable. First, given a state sequence, one has a closed solution for the maximally probable trajectory that mimics both the natural poses and velocities of the face. Secondly, through the use of an entropy-minimizing learning algorithm, one can estimate probabilistic models which give unique, unambiguous state sequences.

The second point is slightly subtle. It is always possible to extract a most probable state sequence from a hidden Markov model Viterbi analysis, but typically there may be thousands of other sequences that are only slightly less probable, so that the most probable sequence has only a tiny fraction of the total probability mass. In the subject system, there is a method for estimating sparse hidden Markov models that explicitly minimizes this kind of ambiguity, such that the most probable sequence has most of the probability mass.

In summary, a system for learning a mapping between time-varying signals is used to drive facial animation directly from speech, without laborious voice track analysis. The system learns dynamical models of facial and vocal action from observations of a face and the facial gestures made while speaking. Instead of depending on heuristic intermediate representations such as phonemes or visemes, the system trains hidden Markov models to obtain its own optimal representation of vocal and facial action. An entropy-minimizing training technique using an entropic prior ensures that these models contain sufficient dynamical information to synthesize realistic facial motion to accompany new vocal performances. In addition, they can make optimal use of context to handle ambiguity and relatively long-lasting facial co-articulation effects. The output of the system is a sequence of facial control parameters suitable for driving a variety of different kinds of animation ranging from warped photorealistic images to 3D cartoon characters.

BRIEF DESCRIPTION OF THE DRAWINGS

These and other features of the Subject Invention will be better understood in connection with the Detailed Description taken in conjunction with the Drawing of which.

DETAILED DESCRIPTION

Figure 1:
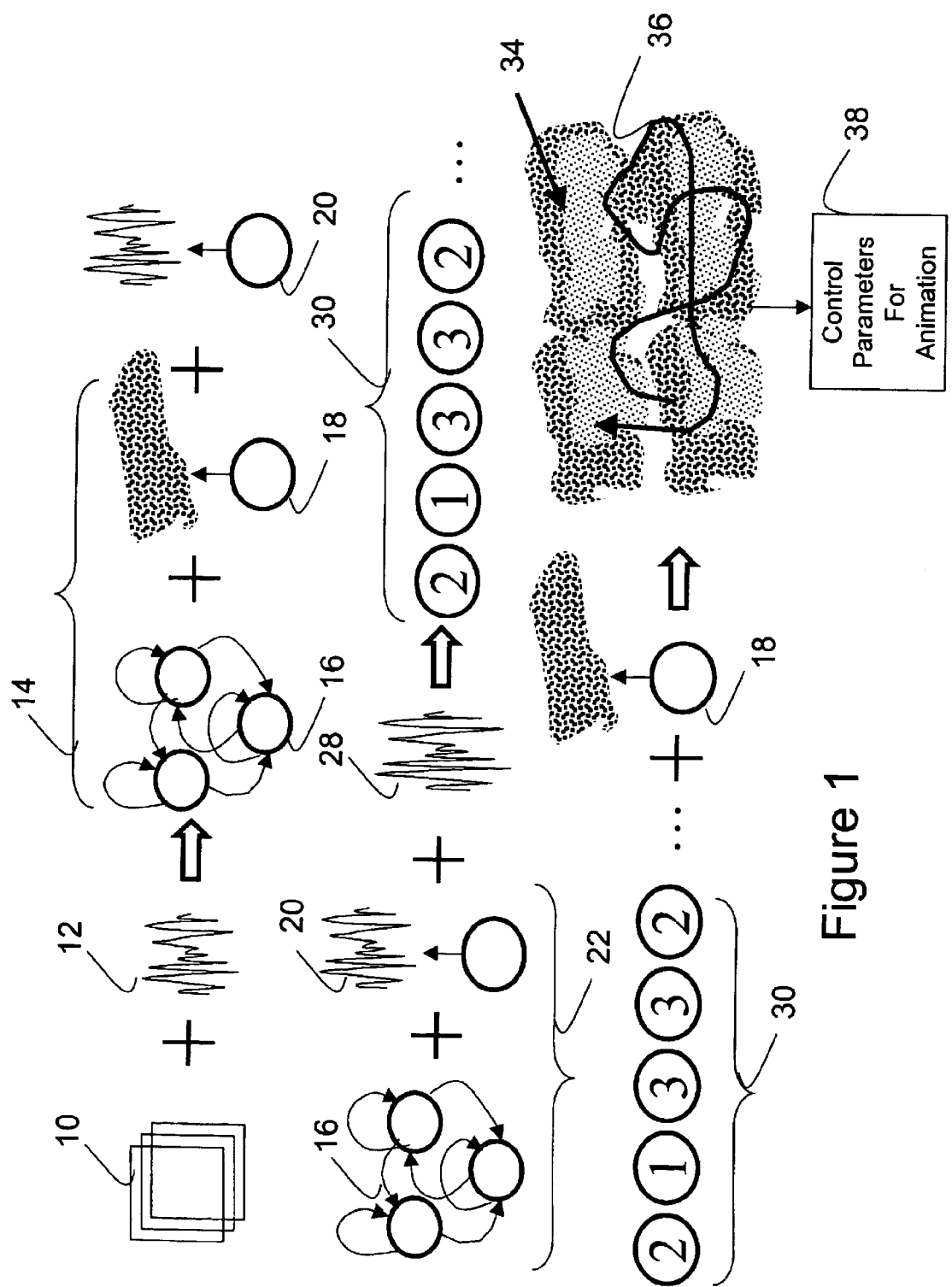
FIG. 1 is a diagrammatic representation of the operation of the facial animation system including both video and audio training, the generation of a facial hidden Markov model which is combined with mappings to audio features to form a vocal hidden Markov model with which new audio is analyzed so as to provide an optimal facial state sequence, and from which is calculated an optimal facial configuration sequence in terms of a trajectory through facial configuration space, thereby providing control parameters for animation.

Referring now to FIG. 1, a system for providing control parameters for animation using hidden Markov models or HMMs, first starts with video frames 10 and a synchronized audio file 12, both used for training. Features in the video such as the corners of the mouth are tracked and this information is used to entropically train a facial hidden Markov model 14 consisting of a facial state machine 16 and mappings to facial configuration 18.

Having learned a facial hidden Markov model, mappings are estimated from facial states to audio features as illustrated at 20 which provides a vocal hidden Markov model 22 having facial dynamics 16, but driven by audio-to-audio configurations 20.

This model is then utilized to predict facial states from new audio 28 to provide an optimal facial state sequence 30 which in communication with facial mappings 18 provide an optimal trajectory 36 through facial configuration space 34 such that, trajectory 36 defines a sequence of control parameters for animation as illustrated at 38.

Figure 2:
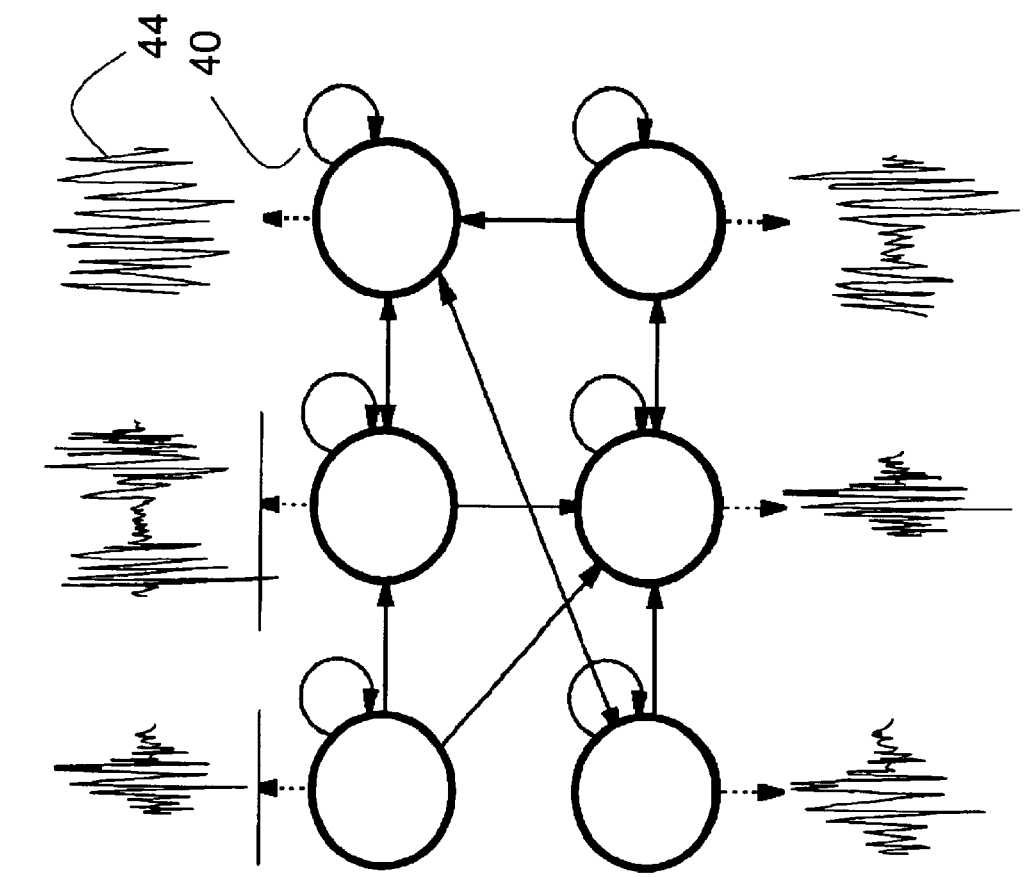
FIG. 2 is a diagrammatic illustration showing in schematic form how the state machine inside the facial hidden Markov model is reused in the vocal hidden Markov model; and, FIG. 3 is a flow chart illustrating both learning through the utilization of entropic hidden Markov model training and the production of a synthetic face trajectory through the utilization of the vocal/facial hidden Markov model.
Figure 2:
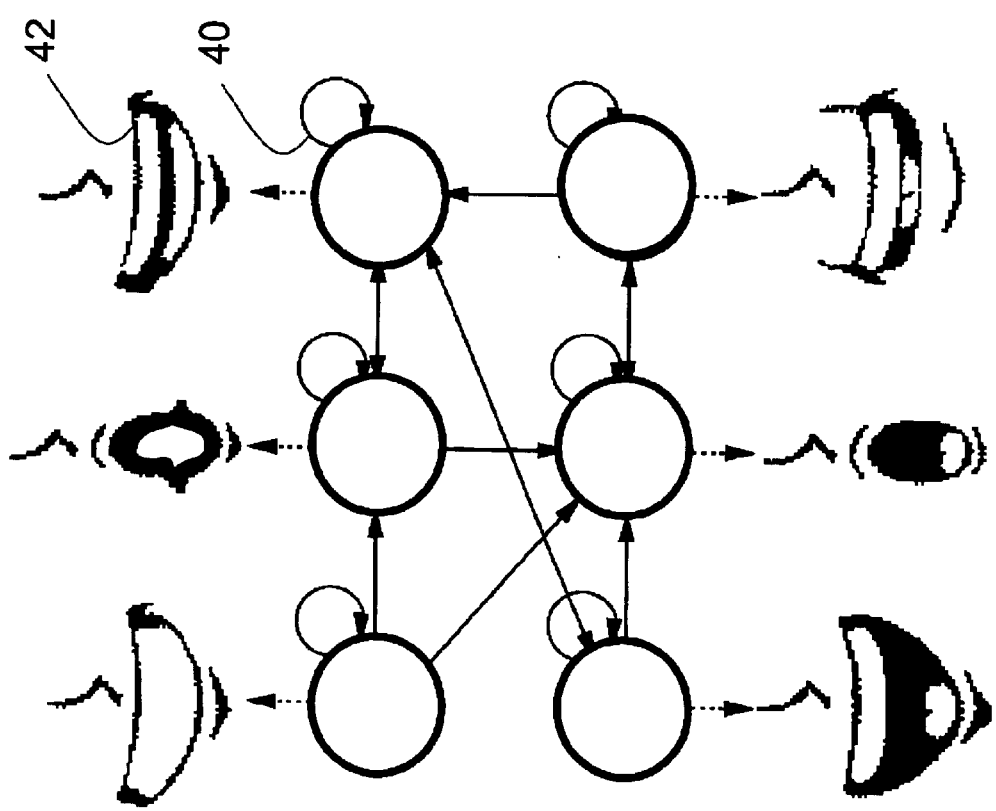

Referring now to FIG. 2, a highly schematic drawing is shown illustrating how the state machine 40 inside the facial hidden Markov model is reused in the vocal hidden Markov model. Here, the mappings from states to facial configuration space are schematized by showing the average facial expression of each mapping 42. To control the vocal hidden Markov model, the internal state machine 40 is retained, thus preserving facial dynamics. However, new mappings are made to vocal configuration space 44.

Figure 3:
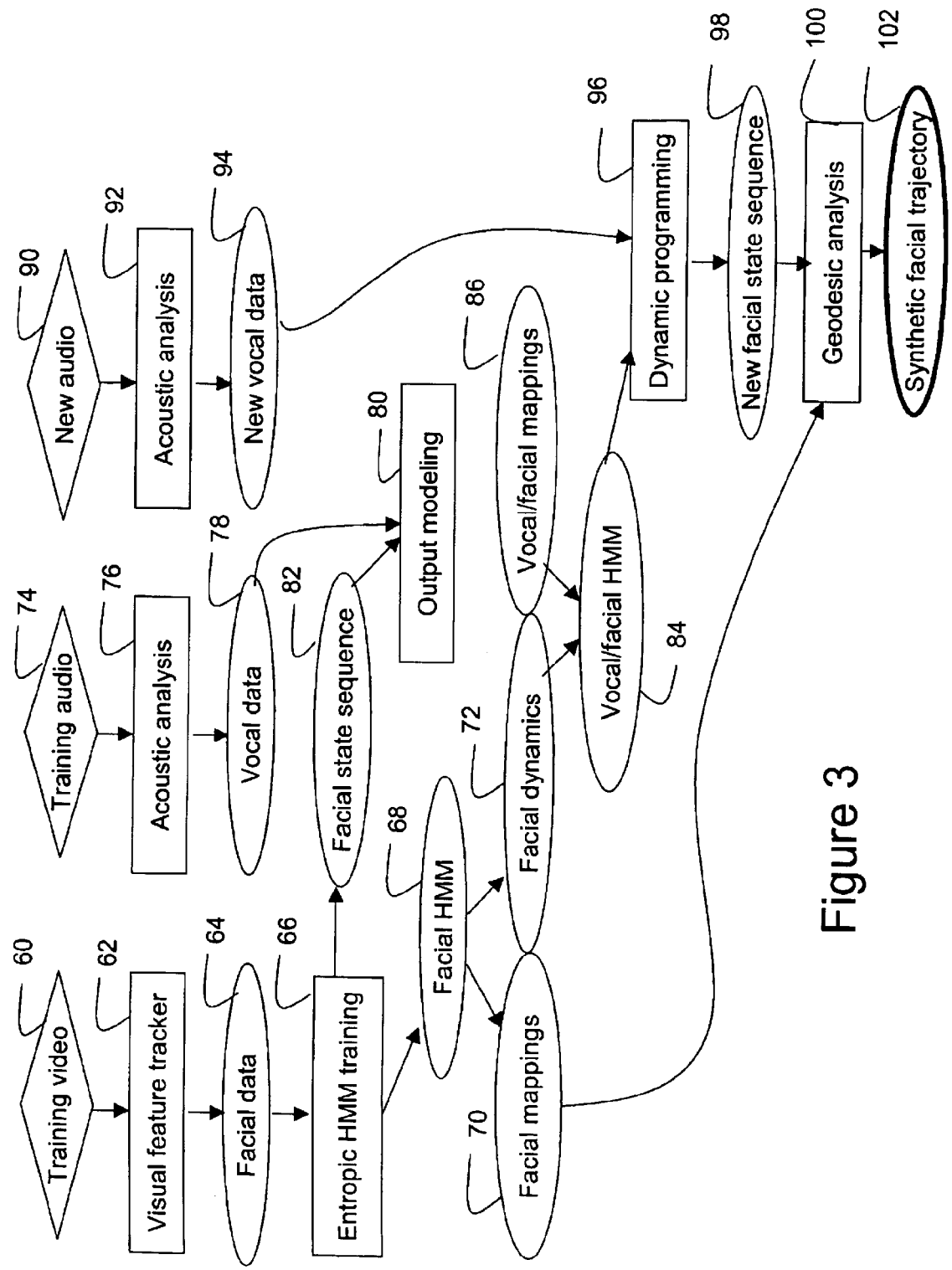

Referring now to FIG. 3, a flow chart is illustrated as to how the synthetic face trajectory is generated. As can be seen, a training video 60 is fed to a visual feature tracker 62 which generates facial motion data 64 that is utilized as an input to an entropic hidden Markov model training algorithm 66. The entropic hidden Markov model training unit produces a facial hidden Markov model which is composed of mappings to facial configuration space 70 and a state machine describing facial dynamics 72.

The facial configurations and facial dynamics which most closely correspond to the animation required are married with the audio style of the individual by utilizing a similar training scenario in which audio 74 goes through acoustic analysis 76 that outputs vocal data 78 which is utilized in an output modeling module 80. The link between the video and the audio is provided by a facial state sequence 82 which is a series of facial images in a facial space. Combining the facial state sequence 82 with the vocal data 78 produces a set of vocal mappings 86, one for each facial state. The facial mappings, the facial dynamics, and the vocal mappings constitute the learned model from which a vocal/facial hidden Markov model 84 is produced.

During run time, new audio 90 is put through acoustic analysis 92 which then provides new vocal data 94. The vocal/facial hidden Markov model, in combination with the new vocal data, produces via dynamic programming 96 a new optimal facial state sequence 98. Geodesic analysis 100 combines the new facial state sequence 98 and the facial mappings 70 to provide a synthetic face trajectory 102 which is then utilized in the animation.

The utilization of the entropically trained hidden Markov models permits lifelike animation to be achieved through a simple training session which does not require lengthy voice segmentation or dissection. The subject system, can be trained in near-realtime on a midrange computer. Once trained, it can generate novel animators in realtime or faster.

To obtain facial articulation data, a computer vision system is used to simultaneously track several individual features on the face, such as the corners of the mouth. Taking Hager's SSD texture-based tracker, as described by G. Hager and K. Toyama, The Xvision system: A general-purpose substrate for portable real-time vision applications, Computer Vision arid Image Under-standing, 1997, as a starting point, a mesh of such trackers covers the face. Spring tensions are assigned to each edge connecting a pair of trackers, and the entire system is made to relax by simultaneously minimizing the spring energies and the residuals of the individual trackers. If a tracker falls off its landmark feature, spring forces from its neighbors tend to push it back into place. To estimate spring lengths and stiffnesses, video is run through the system and the mean and variance of the distance between pairs of trackers is recorded arid used to revise the spring properties. A few repetitions suffice to obtain stable and accurate tracking.

To obtain a useful vocal representation, a mix of LPC and RASTA-PLP features are calculated as discussed by H. Hermansky and N. Morgan, Rasta processing of speech, IEEE Transactions on Speech and Audio Processing, 2(4):578–589, October 1994. These are known to be useful to speech recognition and somewhat robust to variations between speakers and recording conditions.

The ultimate goal is to learn a mapping from the vocal features in a given time frame to simultaneous facial features. The mapping is many-to-many. Many sounds are compatible with one facial pose; many facial poses are compatible with one sound. Were it not for this ambiguity, one could use a simple regression method such as a perceptron, neural network, or radial basis function network. The only remedy for this ambiguity is to use context from before and after the frame of interest. The fact that the disambiguating context has no fixed length or proximity to the current frame strongly recommends that one use a hidden Markov model, which, if properly trained, can make optimal use of context across a whole utterance, regardless of its length. A hidden Markov model uses its hidden states to carry contextual information forward and backward in time. Training will naturally assign some states to that task.

Since the hidden state changes in each frame under the influence of the observed data, it is important for the matrix governing state transitions in the hidden Markov model to be sparse, else a context-carrying state will easily transition to a data-driven state. and the contextual information will be lost. A framework has been developed for training probabilistic models that minimizes their internal entropy. In hidden Markov models, this translates to maximizing compactness, sparsity, capacity to carry contextual information, and specificity of the states. The last property is particularly important because conventionally trained hidden Markov models typically express the content of a frame as a mixture of states, making it impossible to say that the system was in any one state.

In one embodiment, the entropic training framework here is as follows and is outlined in U.S. application Ser. No. 08/994,533, filed Dec. 19, 1997 and incorporated herein by reference. The system begins with a dataset X and a model whose parameters arid structure are specified by the sparse matrix θ. In conventional training, one assumes that the sparsity structure of θ is set in advance and one estimates non-zero parameters to maximize the likelihood $P(X|\theta)$ of the data X given the model θ. In entropic training, one learns the size of θ, its sparsity structure, and its parameter values simultaneously by maximizing the posterior given by Bayes' rule, $P(\theta|X)=P(X|\theta)P(\theta)/P(X)$ where the entropic prior $P(\theta)=e^{-H(\theta)}$ and $H(\theta)$ is an entropy measure defined on the model's parameters. Entropy measures uncertainty. Thus one is seeking the least ambiguous model that can explain the data. The entropic prior can also be understood as a mathematization of Occam's razor: Smaller models are less ambiguous because they contain fewer alternatives.

Given a factorizable model such as a hidden Markov model, the Maximum A Posteriori (MAP) problem decomposes into a separate equation for each independent parameter in Q, each having its own entropic prior. Exact solutions have been found for a wide variety of such equations, yielding very fast learning algorithms. A related set of trimming equations tells one when one can zero a parameter without loss of posterior probability. This allows one to learn the proper size and sparsity structure of a model. Having an entropy term in the posterior also makes it easy to fold deterministic annealing, a powerful quasi-global optimization technique, into learning at no additional computational cost. Frequently, entropic training of hidden Markov models recovers a finite-state machine that is very close to the mechanism that generated the data.

Using entropic training, one estimates a facial dynamical model from the poses and velocities output by the vision system. One then uses a dynamic programming analysis to find the most probable sequence of hidden states given the training video. Using this state sequence, one estimates output probabilities, given each state, of the synchronized audio track. This associates audio features to each facial state. Then one splits the facial model in two. One sets aside the output probabilities that associate each state to its plausible range of facial configurations and velocities. The internal state machine, which represents facial dynamics in terms of transitions between qualitative, sub-viseme, states, is joined to the audio output probabilities. This results in a new vocal hidden Markov model which preserves the dynamics of the face, but allows them to be controlled by vocal features.

To synthesize facial movements to accompany a new vocal track, one uses the vocal hidden Markov model to find a maximally probable sequence of predicted facial states. This sequence will follow the natural dynamics of the face, but is steered by information in the new vocal track. One then uses the facial output probabilities to make a mapping from predicted states to actual facial configurations. Were one to simply pick the most probable configuration for each state, the animation would jerk from pose to pose. The timing would be natural, but the jerkiness would not. Most phoneme- and viseme-based lip-sync systems solve this problem by interpolating or splining between poses. This might solve the jerkiness, but it is an ad hoc solution that degrades or destroys the natural timing.

What is required is a short, smooth trajectory that passes through regions of high probability density in configuration space at the right time. Prior approaches to trajectory estimation typically involve maximizing an equation having a probability term and penalty terms for excess length and/or kinkiness and/or point clumpiness. The user must choose a parameterization and weight-ing for each term. Computing a solution is often approximate, iterative, and computationally expensive. Moreover, the equation may have many local maxima and one may not be able to tell whether the found maxima is near-optimal or mediocre.

In the subject system, the problem is simplified so significantly that a closed-form solution is available. The facial mappings by themselves containing enough information to completely specify the smooth trajectory that is most consistent with the facial dynamics. Because both pose and velocity are modeled, one has constraints on the position, heading, and length of each trajectory segment. This suffices to guarantee that the trajectory is geometrically and temporally well-behaved. It also leads to a very clean formulation.

One assumes that each state has Gaussian outputs that model positions and velocities. For simplicity of exposition, one assumes a single Gaussian per state, but the subject system trivially generalizes to Gaussian mixtures. From hidden Markov model training, one has the mean position and velocity for each state, as well as a full-rank inverse covariance matrix relating positions and velocities in all dimensions. From Viterbi analysis of the new voice data, one has a sequence of states governing each frame. One wants a facial trajectory that, passes through or near the appropriate mean in each frame 1,2,3, . . . This can be written as a product of Gaussians, one for each frame as determined by the governing state. Taking the log yields a quadratic sum, which one seeks to maximize. Let $\mu, \dot{\mu}_i$ be the mean position and velocity for state i, and $K_i$ be a full-rank covariance matrix relating positions and velocities in all dimensions. Furthermore, let s(t) be the state governing frame t and let $Y=\{y_1, y_2, y_3, \ldots\}$ be the variable of interest, namely, the points the trajectory passes through at frame 1,2,3, . . . Then we want the maximum of $$Y^* = \operatorname*{argmax}_Y \log \prod_t \mathcal{N}(\tilde{y}_t; [\mu_{s(t)}, \dot{\mu}_{s(t)}], K_{s(t)}) \tag{1}$$

$$= \operatorname*{argmin}_Y \sum_t \tilde{y}_t K_{s(t)}^{-1} \tilde{y}_t^T / 2 + c$$

where $\tilde{y}_t = [y_t - \mu_{s(t)}; (y_t - y_{-1}) - \dot{\mu}_{s(t)}]$ is a row vector of instantaneous facial position and velocity. These equations yield a quadratic form having a single global maximum. Setting their derivative to zero yields a block-banded system of linear equations in which each control point in the facial trajectory depends only on its neighbors. For T frames and D dimensions, the system can be LU-decomposed and solved in time $O(TD^2)$ as discussed by G. H. Golub and C. F. van Loan. Matrix Computations. Johns Hopkins, 1996. 3rd edition, section [4.3.1].

As to animation, the system synthesizes would-be facial tracking data, e.g., what most probably would have been seen had the training subject produced the input vocalization. Such a trajectory of control points is used to drive a 3D animated head model or a 2D face image warped to give the appearance of motion. In a solution that provides a surprisingly good illusion of realism, a 2D image of a face is texture-mapped onto a crude 3D head model count. Simple deformations of the head model give a naturalistic illusion of facial motion while the shading of the image gives the illusion of smooth surfaces.

The deformations can be applied directly by mapping control points in the synthesized trajectory to vertices in the model, or indirectly by mapping synthetic facial configurations to Facial Action Units as discussed by P. Ekman and W. Friesen, Manual for the Facial Action Coding System, Consulting Psychologists Press, Inc., Palo Alto, Calif., 1978 that are defined on the model.

Even with grossly insufficient training data, one is able to obtain correct behavior for all the vowels and most consonants. In addition, one is able to predict the motions of the upper face, including eyebrows, quite accurately. With a slightly larger data set, only 16 states were found sufficient to produce a quite natural looking facial animation. This means that, for normal speech, facial motion can be coded and reconstructed using at most 4 bits per frame.

Program listings in MatLab which describe the subject process are now presented.

Program listings in MatLab which describe the subject process are now presented.

```
1  %TRAIN_PUPPET Learn an HMM for facial dynamics plus mappings to vocal dynamics.
2  %  [Transitions,Starts,MeansF,CovariancesF,MeansV,CovariancesV, ...
3  %   loglike,occupancy,eigF,nPCAf,faceMean] ...
4  %    = train_puppet(face,voice,lengths,nstates,PCAfrac,eigF,nPCAf,faceMean)
5  %
```

```
 6  % Assumes face and voice are synchronized data.
 7  % Suggest a large # of states.
 8  %
 9  % PCA reduction of data is only done if eigenvector outputs are requested.
10  %
11  % face -- stacked facial observation vectors
12  % voice -- stacked vocal observation vectors
13  % lengths -- lengths of each training sequence
14  % nstates -- initial # states for HMM (dynamical model) (default=40)
15  % PCAfrac -- fraction face variance preserved by Principal Components Analysis
16  %          (default=98%; PCA disabled if PCAfrac>=1 or eigV not requested)
17  % Transitions -- HMM transition matrix
18  % Starts -- HMM prior state probabilities
19  % MeansF -- output means for facial data
20  % CovariancesF -- output covariances for facial data
21  % MeansF -- output means for vocal data
22  % CovariancesF -- output covariances for vocal data
23  % loglike -- loglikelihood of face data given face dynamics model
24  % eigF -- facial eigenvectors
25  % nPCAf -- # facial eigenvectors used to reduce data
26  % faceMean -- mean facial vector
27  %
28  % $Id: train_puppet.m,v 1.19 1998/09/23 20:42:15 brand Exp $
29
30  function [Transitions,Starts,MeansF,CovariancesF,MeansV,CovariancesV,...
31      loglike,occupancy,eigF,nPCAf,faceMean] ...
32      = train_puppet(face,voice,lengths,nstates,PCAfrac,eigF,nPCAf,faceMean)
33
34  if nargin<3, lengths=[size(face,1)]; end;
35  if nargin<4, nstates=40; end;                    % default # of states
36  if nargin>=5, PCAfrac=min(1,max(0.25,PCAfrac));
37  elseif nargout>9, PCAfrac=0.98;                  % do facial PCA if requested
38  else PCAfrac=1; end;
39
40  % Reduce dimensionality of data. Helps to prevent Gaussian collapse in HMM.
41  if PCAfrac<1,
42    fprintf(2, '*** PCA on face...\n');
43    if nargin<6,
44      [eigF,faceMean,eigenvalsF]=klt_svd(face');
45      % set #PCA coefficients to capture ~PCAfrac of the variance
46      [j,nPCAf]=min((cumsum(eigenvalsF)-sum(eigenvalsF).*PCAfrac).^2);%nPCAf
47    end;
48    face=eigcode(face',faceMean,eigF,1:nPCAf)';
49    fprintf(2, '   Reduced to %d dimensions\n', size(face,2));
50  else
51    [eigF,nPCAf,faceMean] = deal([]);
52  end;
53
54  face=with_velocities(face);
55  if 1,
56    face=face+randn(size(face)).*0.5;              % Add random noise to prevent collapse
57  end;
58  [T,df]=size(face);
59
60  if 0,                                            % initialization, now ignored
61    [MeansV, CovariancesV] = mixture(voice, ...
62      {'status', 0, 'epsilon', 1e-6, 'itmax', 200, ...
63      'z', [0 0], 'y', [0 0; 0 0]}, nstates);
64    fprintf('\n');
65    for i=1:nstates,
66      MeansF(i,:)=stoch(B3(voice,CovariancesV(:,:,i),MeansV(i,:)))'*face;
67    end;
68  else
69    MeansF = face(ceil(nstates.*rand(1,nstates)),:);
70    MeansF=MeansF+0.01.*randn(size(MeansF));
71  end;
72
73
74  % Learn facial model. Using a large # of states should result in a
75  % low-perplexity model, so that each time-step will be dominated by a single
76  % state.
77  Transitions = stoch(rand(nstates));              % random HMM initialization
78  Starts=stoch(2.^(-(1:nstates)));                 % prefer just a few start states
79  [Transitions,Starts,MeansF,CovariancesF,loglike] = ...
80      hmm(face, lengths_to_indices(lengths), ...
81      {'status', 0, 'epsilon', 1e-10, 'itmax', 1000, 'z', [1 -1], 'y', [1 -1; 0 0], ...
82      'trimperiod', 1, 'trimratio', 1e-1, 'trimepsilon', 1e-10, 'trimcycles', +Inf, ...
83      'schedule', [7:-.05:0], 'iccabort', 1}, ...
84      Transitions, Starts);
85  % 2 -.2
```

```
 86    %'schedule', [5 * 0.95.^(0:200), 0]}, ...
 87    nstates = length(Starts);
 88
 89    N=length(Starts);
 90    d=size(face,2);
 91
 92    % Get state probabilities for each time-step.
 93    occupancy=zeros(size(face,1),N);
 94    for j = 1:N,                                          % P(states|output distributions)
 95      occupancy(:,j) = B3(face,CovariancesF(:,:,j), MeansF(j,:));
 96    end
 97    [loglike,f,b,occupancy] = ...                         % P(states|output & transition dists)
 98        fb_analysis(Transitions,Starts,occupancy);
 99
100    if 0,                                                 % print out diagnostic info
101      % mean entropy of face data given model
102      avg_entropy = mean(occupancy*log(occupancy'+realmin))
103      % most probable state in each frame
104      [pstates,state_sequence]=max(occupancy'); %
105      % normalized probability mass of this sequence (optimal=max=1)
106      p_best_seq = mean(pstates);
107    end;
108
109    if nargin>1 & ~isempty(voice),
110      pstates=sum(occupancy);
111      [MeansV,CovariancesV] = map_puppet(occupancy,voice);
112    end;
113
114
  1    %MAP_PUPPET Maps vocal features to a states in a facial HMM.
  2    % function [MeansV,CovariancesV] = map_puppet(occupancy,voice)
  3    %
  4    % occupancy -- stacked facial state probability vectors
  5    % voice -- stacked vocal observation vectors
  6    % lengths -- lengths of each training sequence
  7    %
  8    % $Id: map_puppet.m,v 1.1 1998/09/23 20:42:30 brand Exp $
  9
 10    function [MeansV,CovariancesV] = map_puppet(occupancy,voice)
 11
 12    [T,nstates]=size(occupancy);
 13
 14    d=size(voice,2);
 15
 16    pstates=sum(occupancy);
 17
 18    % Per-state means of the vocal data, weighted by facial state occupancies
 19    MeansV=vprod(1./pstates.',occupancy.'*voice);
 20
 21    % Per-state covariances of the vocal data, similarly weighted
 22    CovariancesV=zeros(d,d,nstates);
 23    for j=1:nstates,
 24      CovariancesV(:,:,j) = wcov(voice,occupancy(:,j),MeansV(j,:),1)./pstates(j);
 25    end;
 26
 27

1    %PUPPET Synthesize a facial motion sequence to sync with an acoustic sequence.
  2    % function [face,states,loglike] =
  3    %     puppet(Transitions,Starts,MeansF,CovariancesF,MeansV,CovariancesV,voice,
  4    %            eigF,nPCAf,faceMean,faceSTDi)
  5    %
  6    % Transitions -- HMM transition matrix
  7    % Starts -- HMM prior state probabilities
  8    % MeansF -- output means for facial data
  9    % CovariancesF -- output covariances for facial data
 10    % MeansF -- output means for vocal data
 11    % CovariancesF -- output covariances for vocal data
 12    % voice -- stacked vocal observation vectors
 13    % face -- stacked facial configuration parameters
 14    % loglike -- loglikelihood of voice model given dynamical model
 15    % eigF -- facial eigenvectors
 16    % nPCAf -- # facial eigenvectors used to reduce data
 17    % faceMean -- mean facial vector
 18    %
 19    % $Id: puppet.m,v 1.8 1998/09/23 20:40:21 brand Exp $
 20
 21    function [face,states,loglike] = ...
 22        puppet(Transitions,Starts,MeansF,CovariancesF,MeansV,CovariancesV,voice,...
 23        eigF,nPCAf,faceMean,faceSTDi)
```

```
24
25
26  % Begin by finding a most probable state sequence consistent with the voice
27  % data.  Generally, the two options will yield identical results.  Viterbi
28  % analysis is somewhat faster.
29  if 1,
30    % Find the most probable state sequence via Viterbi analysis
31    [loglike,states] = viterbi(Transitions,Starts,MeansV,CovariancesV,voice);
32  else
33    % Find a sequence of the most probable states via forward-backward
34    % analysis
35    [N, d]=size(MeansV);
36    occupancy=zeros(size(voice,1),N);
37    for j = 1:N,                                      % P(voice|states)
38      occupancy(:,j) = B3(voice,CovariancesV(:,:,j), MeansV(j,:));
39    end
40    [loglike,f,b,occupancy] = ...                     % P(states|voice & transition dists)
41       fb_analysis(Transitions,Starts,occupancy);
42    %clear f; clear b;
43    [vals,states] = max(occupancy.');
44    % Degree of ambiguity w.r.t. the optimal path
45    avg_entropy = -mean(sum(occupancy.*log(occupancy+realmin),2))
46  end
47
48
49  % Find the most probable trajectory through PCA face-space given the states.
50  [N,d]=size(MeansF);
51  iC=zeros(d,d,N);
52  for i=1:N,                                          % invert covariance matrices
53    iv=inv(CovariancesF(:,:,i));
54    iC(:,:,i)=(iv+iv')./2;                            % make sure inverse is symmetric
55  end;
56  face=smooth_path(MeansF,iC,states);
57  face(1,:)=[];                                       % 1st point is artificial; drop it
58  if 0,
59    face=vprod(1./faceSTDi(1:d./2),face);
60  end;
61
62
63  % Reconstruct full face-space trajectory from PCA coefficients
64  if nPCAf>0, face=(vadd(faceMean,eigF(:,1:nPCAf)*face'))'; end;

1  function [Coeff,Res,Xrec] = f(X,Xmean,U,n)
 2  %
 3  % Syntax:   [Coeff,Res,Xrec] = eigcode(X,Xmean,U,n);
 4  %
 5  % This matrix computes the n-index projection coefficients for
 6  % X using the eigenvectors in U
 7  %
 8  % Xrec is the reconstruction using the first n eigenvectors
 9  % Res is the residual (distance-from-feature-space) per pixel
10  %
11  % Author: baback@media.mit.edu
12  % Date    : 08/31/93
13
14  [N,M]=size(U);
15  [Nx,Mx]=size(X);
16
17  P = vadd(-Xmean,X);
18
19  Un = U(:,n);
20  Coeff = Un'*P;
21
22  if nargout>=2
23    Ex = diag(P'*P);
24    Ec = diag(Coeff'*Coeff);
25    Res = Ex - Ec;
26    Res = Res/Nx;         % make the residual error normalized (per pixel)
27  end
28
29  if nargout==3
30    Xrec = Xm + Un*Coeff;
31  end;
32

1  function [eigVecs,Xmean,eigVals,S,V]=f(X);
 2  %
 3  % Syntax:   [eigVecs, Xmean, eigVals, S, V] = klt_svd(X);
 4  %
 5  % This functions takes an N-by-M matrix of M N-dimensional observations
 6  % and computes the eigValue-ranked eigVectors (principal components)
```

```
 7  %
 8  % It uses Singular-Value-Decomposition to return the left singular vectors
 9  % in eigVecs, the singular values in S and the right singular vectors in V,
10  % and the eigenvalues associated with the covariance matrix in eigVals
11
12  % Author: baback@media.mit.edu
13  % Date   : 12/16/94
14  % optimized by brand@merl.com 26jun98
15
16  Xmean = mean(X,2);
17  [eigVecs,S,V] = svd(vadd(-Xmean,X),0);
18  S = diag(S);
19  eigVals = S.^2 / size(X,2);
 1  function y=with_velocities(x,lengths);
 2
 3  if nargin<2, lengths=size(x,1); end;
 4  dx=[zeros(1,size(x,2));diff(x)];    % velocities
 5  for i=(cumsum(lengths)-(lengths(1)-1)); dx(i,:)=0; end;
 6  y=[x,dx];    % add velocities
 7
 1  function x = smooth_path(mu, sinv, seq, secfac)
 2  %SMOOTH_PATH Compute smooth path of observations in hidden Markov model.
 3  %   Given a hidden Markov model in which each state is a Gaussian
 4  %   distribution over several coordinates and their differentials, and
 5  %   a fixed sequence of states through the model, X = SMOOTH_PATH(MU,
 6  %   SINV, SEQ) computes the corresponding most likely sequence of
 7  %   observations.
 8  %
 9  %   Let S be the number of states in the model, and D be the number of
10  %   observation dimensions (not counting the differentials, which
11  %   would add another D dimensions).  Also, let T be the length of the
12  %   fixed state sequence given.  Then MU must be a row-major matrix of
13  %   size [S D], containing the observation means of each state.
14  %   Moreover, SINV must be a three-dimensional array of size [D D S],
15  %   in which each subarray of size [D D] is the inverse observation
16  %   covariance matrix of a state.  Finally, SEQ must be a vector of
17  %   length T, containing a sequence of state numbers.
18  %
19  %   The returned matrix is row-major of size [T+1 D]; it contains the
20  %   row vectors X(0), X(1), ..., X(T) minimizing
21  %
22  %       E = E(1) + E(2) + ... + E(T),
23  %
24  %   where
25  %
26  %       E(t) = Y(t) * SINV(SEQ(t)) * Y(t)',
27  %
28  %   in which
29  %
30  %       Y(t) = [X(t), X(t)-X(t-1)] - MU(SEQ(t)).
31  %
32  %   As an additional feature, if a fourth argument SECFAC is
33  %   specified and nonzero, an additional term is added to the energy
34  %   function E, namely
35  %
36  %       SECFAC * sum(sum(diff(diff(X)).^2))
37  %
38  %   For positive SECFAC, this makes the curve smoother.
39  %
40  %   $Id: smooth_path.m,v 1.9 1998/08/12 20:27:02 shan Exp $
41
42  % Get input dimensions.
43  [states, dimensions] = size(mu);
44  dimen = dimensions / 2;
45  ticks = length(seq);
46
47  % Save useful constants.
48  dimen1 = dimen + 1;
49  ddimen = dimen + dimen;
50  dimenq = dimen * dimen;
51  ticks1 = ticks + 1;
52  ticks1_d = ticks1 * dimen;
53
54  % Check input arguments.
55  if ~isequal(floor(dimen), dimen),
56      error('Number of dimensions is not even.'); end;
57  if ~isequal(size(sinv), [dimensions dimensions states]) & ...
58      ~(states == 1 & isequal(size(sinv), [dimensions dimensions])),
59      error('Mismatch in size between mu and sinv.'); end;
```

```
60  if ~isequal(sinv, permute(sinv, [2 1 3])),
61      error('Lack of symmetry in sinv.'); end;
62
63  % Compute the four quadrants of the covariances.
64  A = sinv(      1: dimen,        1: dimen, :);
65  B = sinv(      1: dimen, dimen1:ddimen, :);
66  C = sinv(dimen1:ddimen,        1: dimen, :);
67  D = sinv(dimen1:ddimen, dimen1:ddimen, :);
68
69  % Compute the two halves of transformed means.
70  alpha = zeros(states, dimen);
71  beta  = zeros(states, dimen);
72  for s = 1:states,
73      foo = mu(s,:) * sinv(:,:,s);
74      alpha(s,:) = foo(      1: dimen);
75      beta (s,:) = foo(dimen1:ddimen);
76  end;
77  clear foo;
78  gamma = alpha + beta;
79  clear alpha;
80
81  % Compute the left and right hand sides of the linear equations.
82  Lv = zeros(dimen, dimen * (ticks * 3 + 1)); Li = Lv; Lj = Lv;
83  c1 = 1; c2 = dimen;
84  R = zeros(ticks1_d, 1);
85  s1 = seq(1);
86  [Li(:,c1:c2), Lj(:,c1:c2)] = ndgrid(1:ticks1:ticks1_d,2:ticks1:ticks1_d);
87   Lv(:,c1:c2)               = -(C(:,:,s1) + D(:,:,s1));
88  c1 = c1 + dimen; c2 = c2 + dimen;
89  [Li(:,c1:c2), Lj(:,c1:c2)] = ndgrid(1:ticks1:ticks1_d,1:ticks1:ticks1_d);
90   Lv(:,c1:c2)               = D(:,:,s1);
91  R(1:ticks1:ticks1_d) = -beta(s1,:);
92  c1 = c1 + dimen; c2 = c2 + dimen;
93  for t = 1:ticks-1,
94      s0 = s1;
95      s1 = seq(t+1);
96      [Li(:,c1:c2), Lj(:,c1:c2)] = ndgrid(t+1:ticks1:ticks1_d,t+2:ticks1:ticks1_d);
97       Lv(:,c1:c2)               = -(C(:,:,s1) + D(:,:,s1));
98      c1 = c1 + dimen; c2 = c2 + dimen;
99      [Li(:,c1:c2), Lj(:,c1:c2)] = ndgrid(t+1:ticks1:ticks1_d,t+1:ticks1:ticks1_d);
100      Lv(:,c1:c2)               = A(:,:,s0) + B(:,:,s0) + C(:,:,s0) + D(:,:,s0) + D(:,:,s1);
101     c1 = c1 + dimen; c2 = c2 + dimen;
102     [Li(:,c1:c2), Lj(:,c1:c2)] = ndgrid(t+1:ticks1:ticks1_d,t+0:ticks1:ticks1_d);
103      Lv(:,c1:c2)               = -(B(:,:,s0) + D(:,:,s0));
104     c1 = c1 + dimen; c2 = c2 + dimen;
105     R(t+1:ticks1:ticks1_d) = gamma(s0,:) - beta(s1,:);
106 end;
107 s0 = s1;
108 clear s1;
109 [Li(:,c1:c2), Lj(:,c1:c2)] = ndgrid(ticks1:ticks1:ticks1_d,ticks1:ticks1:ticks1_d);
110  Lv(:,c1:c2)               = A(:,:,s0) + B(:,:,s0) + C(:,:,s0) + D(:,:,s0);
111 c1 = c1 + dimen; c2 = c2 + dimen;
112 [Li(:,c1:c2), Lj(:,c1:c2)] = ndgrid(ticks1:ticks1:ticks1_d,ticks :ticks1:ticks1_d);
113  Lv(:,c1:c2)               = -(B(:,:,s0) + D(:,:,s0));
114 R(ticks1:ticks1:ticks1_d) = gamma(s0,:);
115 clear s0 c1 c2;
116 L = sparse(Li, Lj, Lv, ticks1_d, ticks1_d);
117 clear Li Lj Lv;
118
119 % Handle second-order differential factor.
120 if nargin > 3 & secfac ~= 0,
121     Bi = repmat((1:dimen)', dimen, 1);
122     Bj = reshape(repmat(1:dimen, dimen, 1), dimen*dimen, 1);
123     Li = ndgrid_transform([1 dimen], Bi, ...
124             [2:ticks, 2:ticks-1, 2:ticks-2, 1:ticks-2, 0:ticks-2, ...
125              0, 0, 1, 1, ticks-1, ticks-1, ticks, ticks]);
126     Lj = ndgrid_transform([1 dimen], Bj, ...
127             [0:ticks-2, 1:ticks-2, 2:ticks-2, 2:ticks-1, 2:ticks, ...
128              0, 1, 0, 1, ticks-1, ticks, ticks-1, ticks]);
129     Lv = repmat([repmat(  secfac, 1, ticks-1), ...
130                  repmat(-4*secfac, 1, ticks-2), ...
131                  repmat( 6*secfac, 1, ticks-3), ...
132                  repmat(-4*secfac, 1, ticks-2), ...
133                  repmat(  secfac, 1, ticks-1), ...
134                  [1 -2 -2 5 5 -2 -2 1] * secfac], dimenq, 1);
135     L = L + sparse(Li, Lj, Lv, ticks1_d, ticks1_d);
136     clear Lv Li Lj Bi Bj;
137 end;
138
139 % Solve the system of linear equations and reshape the answer.
```

```
140   x = reshape(L\R, ticks1, dimen);
  1   function facs = project_face(face, vscale, vmap, ...
  2           vertices, faces, actions, actions_to_use)
  3   %PROJECT_FACE Convert facial coordinates into action units.
  4   %     FACS = PROJECT_FACE(FACE, VSCALE, VMAP, V, F, A) takes the facial model
  5   %     specified by V, F and A (returned by READ_WFM) and maps the facial control
  6   %     point coordinates in FACE to action unit coefficients.
  7   %
  8   %     VSCALE is a vector of length 2 specifying how FACE should be scaled in the X
  9   %     and Y directions before being mapped.  VMAP is a vector whose length is
 10   %     equal to the number of facial control points; it specifies the (0-based)
 11   %     vertex numbers corresponding to each facial control point.  Entries in VMAP
 12   %     that are equal to -1 indicate that the corresponding facial control point
 13   %     should simply be ignored.
 14   %
 15   %     FACS = PROJECT_FACE(FACE, VSCALE, VMAP, V, F, A, ACTIONS_TO_USE) is similar,
 16   %     but only the 0-based action unit indices listed in the vector ACTIONS_TO_USE
 17   %     are considered in the mapping.  For the columns of FACS that correspond to
 18   %     unused action units, NaN is returned.
 19   %
 20   %     $Id: project_face.m,v 1.1 1998/08/18 19:31:54 shan Exp shan $
 21
 22   vmap = vmap(:)';
 23   vmap_used = find(vmap >= 0);
 24   face = face(:, [vmap_used * 2 - 1; vmap_used * 2]);
 25   %face_rest = mean(face);
 26   face_rest = face(1,:); % Use the first frame to get the resting position
 27   face = vprod(reshape(vscale, 1, 2), vadd(-face_rest, face));
 28   if nargin >= 7,
 29       Ut = reshape(permute(actions(vmap(vmap_used)+1, 1:2, actions_to_use+1), ...
 30           [3 2 1]), length(actions_to_use), 2*length(vmap_used));
 31   else
 32       Ut = reshape(permute(actions(vmap(vmap_used)+1, 1:2, :), ...
 33           [3 2 1]), size(actions,3), 2*length(vmap_used));
 34   end;
 35   if 0,
 36       units = size(Ut,1);
 37       ticks = size(face,1);
 38       H = Ut * Ut.';
 39       c = -Ut * face.';
 40       A = -ones(units, units);
 41       b = zeros(units, 1);
 42       facs_ = zeros(ticks, units);
 43       for t = 1:ticks,
 44           if ~rem(t, 100), fprintf(2, 'project_face: %d/%d\r', t, ticks); end;
 45           facs_(t,:) = qp(H, c(:,t), A, b).';
 46       end;
 47       fprintf(2, [27 '[K']);
 48   else
 49       facs_ = face / Ut;
 50   end;
 51   error = mnerror(face, facs_ * Ut)
 52   if nargin >= 7,
 53       facs = repmat(NaN, size(face,1), size(actions,3));
 54       facs(:,actions_to_use+1) = facs_;
 55   else
 56       facs = facs_;
 57   end;
  1   function [transitions, starts, means, covariances, ...
  2         epochs, post, info, prob_factor] = hmm(observations, lengths, options, ...
  3         transitions, starts, means, covariances, info, prob_factor)
  4   %HMM Hidden Markov model training.
  5   %     [TRANSITIONS, STARTS, MEANS, COVARIANCES,
  6   %         EPOCHS, POST, INFO, PROB_FACTOR] = HMM(OBSERVATIONS, LENGTHS, OPTIONS,
  7   %                 TRANSITIONS, STARTS, MEANS, COVARIANCES, INFO, PROB_FACTOR)
  8   %     trains a hidden Markov model that is either discrete or continuous Gaussian.
  9   %     All input arguments except MEANS, COVARIANCES, INFO and PROB_FACTOR are
 10   %     required, but OPTIONS can be empty, as can MEANS, COVARIANCES, INFO and
 11   %     PROB_FACTOR.  Among the output arguments, EPOCHS is the number of
 12   %     re-estimation cycles used, and POST is the final log-posterior.
 13   %
 14   %     OBSERVATIONS is a matrix of input vectors, one per row.  If the observations
 15   %     are discrete, the width of OBSERVATIONS must be one.
 16   %
 17   %     LENGTHS is a two-column matrix, each row in which specifes the beginning and
 18   %     ending observation indices for each training sequence.  While LENGTH must be
 19   %     specified, it can be empty, in which case the entirety of OBSERVATIONS is
 20   %     considered as one single sequence.
 21   %
```

```
22  %   OPTIONS specifies additional control parameters; see TOPTIONS for details.
23  %
24  %   TRANSITIONS is the transition probability matrix in which each row is a
25  %   source state and each column is a target state.
26  %
27  %   STARTS is a row vector of initial state probabilities.
28  %
29  %   MEANS is a matrix in which each row vector is either the output
30  %   probabilities of a state (in the discrete case) or the output mean
31  %   coordinates of a state (in the continuous case).  If omitted, it is
32  %   initialized randomly from the observations.
33  %
34  %   COVARIANCES is either an empty matrix (in the discrete case) or the output
35  %   covariance matrices of each state concatenated together in the third
36  %   dimension (in the continuous case).  If omitted, it is initialized from the
37  %   observations.
38  %
39  %   INFO is a cell vector in which each entry is associated with a state in the
40  %   model.  Initially, INFO defaults to {1,2,...,n}, where n is the number of
41  %   states.  If and when states are trimmed, their corresponding entries in INFO
42  %   are also removed.
43  %
44  %   PROB_FACTOR is a matrix with one row for each observation and one column for
45  %   each state; whenever HMM computes the conditional probability of an
46  %   observation given a state, it multiplies by the corresponding value in
47  %   PROB_FACTOR, if specified.  This can be used for supervised training.
48  %
49  %   $Id: hmm.m,v 1.26 1998/09/23 20:43:47 brand Exp $
50
51  % Constants
52  persistent CONSTANTS_INITIALIZED
53  persistent REALMIN REALMAX TRIM_EPS CLEAR_EOL
54  if isempty(CONSTANTS_INITIALIZED),
55    REALMIN = realmin;
56    REALMAX = realmax;
57    CLEAR_EOL = [27 '[K'];
58    CONSTANTS_INITIALIZED = 1;
59  end;
60
61  % Initialize and check arguments and variables
62  error(nargchk(5, 9, nargin));
63  if isempty(lengths), lengths = [1 length(observations)]; end;
64  options = toptions(options);
65
66  % Determine whether the data is discrete
67  discrete = min(size(observations)) == 1 ...
68      & ~any(rem(observations(1:min(100,length(observations))), 1));
69
70  % Clip off unused observations
71  points = sum(lengths(:,2) - lengths(:,1) + 1);
72  if points < size(observations, 2),
73    offset = lengths(1,1) - 1;
74    observations = observations(1+offset:points+offset,:);
75    lengths = lengths - offset;
76    clear offset;
77  end;
78
79  % More variable initializations
80  n = size(transitions, 1);               % Number of states
81  [t, d] = size(observations);            % Number of input vectors and dimensions
82  nsequences = size(lengths, 1);          % Number of observation sequences
83  bw_lengths = (lengths(:,2) - lengths(:,1))' + 1;
84  epsilon = options.epsilon;
85  itmax = options.itmax;
86  z_coef = options.z; any_z = any(z_coef);
87  y_coef = options.y; any_y = any(any(y_coef));
88  any_y1 = any(y_coef(1,:));
89  any_y2 = any(y_coef(2,:));
90  any_y1 = any(y_coef(1,:));
91  any_y1 = any(y_coef(1,:));
92  zmax = options.zmax;
93  trimperiod = options.trimperiod;
94  trimratio = options.trimratio;
95  trimepsilon = options.trimepsilon(:);
96  if length(trimepsilon) == 1,
97    trimepsilon = [trimepsilon trimepsilon trimepsilon];
98  elseif length(trimepsilon) == 2 & ~discrete ...
99        | length(trimepsilon) == 3 & discrete,
100 else error('Invalid size for ''trimepsilon'' option'); end;
101 trimcycles = options.trimcycles;
```

```
102    status = options.status;
103    plotting = options.plotting;
104    if plotting, global Movie; end;
105    estoutput = options.estoutput;
106    schedule = options.schedule;
107
108    % Get reestimation transformation matrices, if specified
109    TtransitionsN  = options.TtransitionsN;
110    TstartsN       = options.TstartsN;
111    TmeansN        = options.TmeansN;
112    TmeansD        = options.TmeansD;
113    TcovariancesNt = options.TcovariancesN.';
114
115    % Initialize output parameters if they are not given
116    if nargin < 7 | isempty(means) | isempty(covariances),
117       if discrete,
118          if nargin < 6 | isempty(means),
119             means = stoch(rand(n, max(observations)));
120          end;
121          covariances = [];
122       else
123          if nargin < 6 | isempty(means),
124             means = observations(ceil(rand(n, 1) .* t), :);
125          end;
126          if nargin < 7 | isempty(covariances),
127             covar = cov(observations);
128             if det(covar) <= 0,
129                covar = covar + (2.^(1./d)-1) .* abs(diag(diag(covar))); end;
130             covar = covar./2.^(1./d);   % Halve the volume
131             covariances = repmat(covar, [1 1 n]);
132             clear covar;
133          end;
134       end;
135    end;
136
137    % Initialize info if not given
138    if nargin < 8 | isempty(info),
139       info = cell(1, n);
140       for i = 1:n, info{i} = i; end;
141    end;
142
143    % Default prob_factor unused
144    if nargin < 9, prob_factor = []; end;
145
146    % Prepare for EM loop
147    log2pied2 = 1/2 + (d./2).*log(2.*pi);   % A constant
148    epochs = 1;                     % Epoch number
149    priorp = 0;                     % Negative transition entropy
150                                    % (updated iff any_z)
151    priorsp = zeros(1,n);           % Same, per state except starts
152                                    % (updated iff any_z)
153    logtransitions = zeros(n);      % Log of transitions (or rather, transitions +
154                                    % realmin) (updated iff any_z)
155    priors0 = 0;                    % Same, for starts
156                                    % (updated iff any_z)
157    logstarts = zeros(1,n);         % Log of starts (or rather, starts + realmin)
158                                    % (updated iff any_z)
159    priorc1 = 0;                    % Negative observation entropy (unscaled by priors)
160                                    % (updated iff any_y1)
161    priorsc1 = zeros(1,n);          % Same, per state (unscaled by priors)
162                                    % (updated iff any_y | ~discrete) <-- not a typo
163    if any_y & discrete,
164       priorsc1 = sum(means .* log(means + REALMIN), 2)';
165    elseif ~discrete,
166       for i = 1:n,
167          priorsc1(i) = det(covariances(:,:,i));
168       end;
169       priorsc1 = -log(abs(priorsc1) + REALMIN)./2 - log2pied2;
170    end;
171    priorc2 = 0;                    % Negative observation entropy (scaled by priors)
172                                    % (updated iff any_y2)
173    priorsc2 = zeros(1,n);          % Same, per state (scaled by priors)
174                                    % (updated iff any_y2)
175    priort = 0;                     % log driving term for temperature
176    Otransitions = transitions;     % Old transitions
177    Ostarts = starts;               % Old starts
178    Omeans = means;                 % Old means
179    Ocovariances = covariances;     % Old covariances
180    trimmed = 0;                    % Whether we trimmed anything this epoch
181                                    % (updated iff status >= 0)
```

```
182  trimepoch = 1;           % Epoch when we last performed trimming
183  trimpost = NaN;          % Posterior when we last performed trimming
184  numerrorokay = 0;        % Whether to continue even on numerical error
185  %snapshot hmm 0          % Take initial snapshot
186
187  % EM loop
188  if status >= 0, fprintf(2, '=== Begin EM loop\n'); end;
189  while epochs <= itmax,
190    if epochs >= 2,
191      snapshot hmm
192      oldpost = post;
193    end;
194
195    % Accumulate expectations for all training sequences
196    % and calculate log-likelihood
197    [transitionsN, transitionsD, startsN, covariancesN, ...
198         meansN, meansD, like] = baumwelch_all(transitions, starts, ...
199         covariances, means, observations, bw_lengths, prob_factor);
200    % Remove states that have zero occupancy
201    dead=find(0==meansD);
202    if any(dead),
203      fprintf(2,'Dead after Baumwelch: %d %d %d %d %d %d %d %d\n',dead);
204      [startsN, transitionsN, meansN, covariancesN]= ...
205          kill_state(dead,startsN, transitionsN, meansN, covariancesN);
206      [starts, transitions, means, covariances]= ...
207          kill_state(dead,starts, transitions, means, covariances);
208      meansD(dead)=[]; transitionsD(dead)=[];
209      if length(priorsc1)>1, priorsc1(dead)=[];end; priorsc2(dead)=[];
210      n = n - length(dead);
211      info(dead) = [];
212      if ~isempty(prob_factor), prob_factor(:,dead) = []; end;
213      % TODO: also kill states in mask matrices: TtransitionsN, etc.
214    end;
215
216    % Calculate priors on Markov model and output parameters
217    if any_z,
218      logtransitions = log(transitions + REALMIN);
219      priorsp = sum(transitions .* logtransitions, 2)';
220      logstarts = log(starts + REALMIN);
221      priors0 = sum(starts .* logstarts);
222      priorp = sum(priorsp) + priors0;
223    end;
224    if any_y,
225      if any_y1,
226        priorc1 = sum(priorsc1);
227      end;
228      if any_y2,
229        total_occ = sum(meansD);
230        stoch_occ = meansD ./ total_occ;
231        priorsc2 = priorsc1 .* stoch_occ;
232        priorc2 = sum(priorsc2);
233      end;
234    end;
235
236    % Re-estimate MAP temperature (or take it from the given fixed schedule)
237    % and compute the exponents zz, y1, and y2
238    if isempty(schedule),
239      temperature = z_coef(2) .* priorp ...
240          + y_coef(1,2) .* priorc1 + y_coef(2,2) .* priorc2;
241    elseif epochs <= length(schedule),
242      temperature = schedule(epochs);
243    else
244      temperature = schedule(end);
245    end;
246    zz = z_coef( 1) + z_coef( 2) .* temperature;
247    if zz > zmax,
248      temperature = (zmax - z_coef(1)) / z_coef(2);
249      zz = zmax;
250    end;
251    y1 = y_coef(1,1) + y_coef(1,2) .* temperature;
252    y2 = y_coef(2,1) + y_coef(2,2) .* temperature;
253    priort = -temperature.^2/2;
254
255    % Calculate log-posterior
256    post = like + zz .* priorp + y1 .* priorc1 + y2 .* priorc2 + priort;
257
258    % Print status
259    if status >= 0,
260      fprintf(2, 'Epoch %3d: %#8g = %#-8g', epochs, post, like);
261      if any_z, fprintf(2, ' %#+-8g*%-g', priorp, zz);
```

```
262      else fprintf(2, ' +0'); end;
263      if any_y1, fprintf(2, ' %#+-8g*%-g', priorc1, y1);
264      else fprintf(2, ' +0'); end;
265      if any_y2, fprintf(2, ' %#+-8g*%-g', priorc2, y2);
266      else fprintf(2, ' +0'); end;
267      fprintf(2, ' %+-g @%-g%s', priort, temperature, CLEAR_EOL);
268    end;
269
270    % Draw pretty pictures
271    if plotting,
272      posteriors(epochs) = post;
273      subplot(4,2,3); plot(posteriors);
274      axis([1 itmax min(posteriors) max(posteriors)+1]);
275      subplot(4,2,4); show_transitions(transitions); drawnow;
276    end;
277
278    if epochs > length(schedule) & epochs >= 2,
279      % Test for numerical error
280      if post <= oldpost,
281        if status >= 0,
282          fprintf(2, '\n*** Numerical error %g => %g => %g\n', ...
283                  postbase, oldpost, post);
284        end;
285        if ~numerrorokay,
286          transitions = 0transitions; starts = 0starts;
287          means = 0means; covariances = 0covariances;
288          post = oldpost;
289          break;                  % Bail out with old parameters
290        end;
291      end;
292
293      % Test for convergence
294      if abs((post - oldpost) ./ (post - postbase)) <= epsilon,
295        if status >= 0,
296          fprintf(2, '\n=== Terminating: %g => %g => %g\n', ...
297                  postbase, oldpost, post);
298        end;
299        break;                    % Bail out with converged parameters
300      end;
301    end;
302
303    % Save initial posterior in postbase
304    if epochs == 1, postbase = post; trimpost = post; end;
305
306    % Trim
307    if (trimperiod & (epochs - trimepoch >= trimperiod)) ...
308        | (trimratio & (epochs >= 2) ...
309          & (abs((post - oldpost) ./ (post - trimpost)) <= trimratio)),
310      trimepoch = epochs;
311      for trimcount = 1:trimcycles,
312        trimpost = post;
313        if n <= 1, break; end;
314        just_trimmed = 0;
315
316        % The derivatives of the log-likelihood ("like") with respect to
317        % transitions and starts are:
318        %
319        %          dloglike_t = repmat(transitionsD', 1, n);
320        %          dloglike_s = repmat(nsequences, 1, n);
321
322        % Note that in the computation of dpost_{trim,dist}_[ts] below,
323        % when it comes to the effect of trimming on the y2 term, we
324        % approximate the derivative of meansD wrt transitions by
325        %
326        %            d meansD(k)
327        %          ------------------ = (k == j) * transitionsD(i)
328        %            d transitions(i,j)
329        %
330        % and approximate the derivative of meansD wrt starts by
331        %
332        %            d meansD(k)
333        %          ------------ = (k == j) * nsequences.
334        %            d starts(j)
335        %
336        % In other words, we ignore effects beyond one time step.
337        % TODO: This can be made exact. Chain rule fun.
338
339        % Also, the savings in the y1 term achieved by removing an entire
340        % state is considered separately in the "y1 .* priorsc1" term in the
341        % computation of "gpost_pinch" further down.
```

```
342
343         % Calculate trimming criterion
344         % Approximate gain of post wrt transitions, divided by transitions
345         if y2,
346           temp = y2 .* priorsc1 ./ total_occ;
347           dpost_trim_t = vadd(transitionsD', ...
348               zz .* logtransitions + vprod(temp, transitionsD'));
349         else
350           temp = 0;
351           dpost_trim_t = vadd(transitionsD', zz .* logtransitions);
352         end;
353         % Approximate gain of post wrt starts, divided by starts
354         dpost_trim_s = zz .* logstarts + (temp + 1) .* nsequences;
355         clear temp;
356         % Approximate derivative of post wrt transitions
357         dpost_dist_t = dpost_trim_t + zz;
358         % Approximate derivative of post wrt starts
359         dpost_dist_s = dpost_trim_s + zz;
360         % Holes shall never be redistributed to
361         dpost_dist_t(transitions == 0) = -Inf;
362         dpost_dist_s(starts      == 0) = -Inf;
363         % Approximate gain of post wrt transitions
364         gpost_trim_t = dpost_dist_t .* transitions;
365         % Approximate gain of post wrt starts
366         gpost_trim_s = dpost_dist_s .* starts;
367         % We can only rely on the approximations above where the probability
368         % delta is small
369         gpost_trim_t(transitions >= trimepsilon(2)) = Inf;
370         gpost_trim_s(starts      >= trimepsilon(1)) = Inf;
371         % For each source state, pick best target state to redistribute to
372         [d_dist_t, i_dist_t] = max(dpost_dist_t, [], 2);
373         % Pick best starting state to redistribute to
374         [d_dist_s, i_dist_s] = max(dpost_dist_s, [], 2);
375         % Redistribution gains for starts
376         g_dist_s = d_dist_s .* starts;
377
378         % First, try to zero all incoming links to a state (preferred)
379         gpost_pinch ...  % Approximate gain of pinching a state
380            = d_dist_t' * transitions ...    % Redistribution gains (but no
381            - (d_dist_t .* diag(transitions))' ...  % redistribute to self)
382            + g_dist_s ...                   % Redistribution gains for starts
383            - sum(gpost_trim_t, 1) ...       % Incoming transition trimming gains
384            - sum(gpost_trim_t, 2)' ...      % Outgoing transition trimming gains
385            + diag(gpost_trim_t)' ...        % Don't double-count self-transitions
386            - gpost_trim_s ...               % Starting probability trimming gains
387            - y1 .* priorsc1;                % Model description trimming gains
388         % States with no occupancy are good for pinching
389         % TODO: Do we really need this as a special case?
390         gpost_pinch(transitionsD == 0) = REALMIN;
391         % Prevent redistributing to the state we're pinching
392         gpost_pinch(i_dist_t(i_dist_t ~= (1:n)')) = -Inf;
393         gpost_pinch(i_dist_s) = -Inf;
394         % Find the best state to pinch, if any
395         [g_remove, i_remove] = max(gpost_pinch);
396         if g_remove > 0,
397           % Pinch off state i_remove, redistributing as planned
398           starts(i_remove) = 0;
399           starts(i_dist_s) = 0;
400           starts(i_dist_s) = max(0, 1 - sum(starts));
401           transitions(:,i_remove) = 0;
402           foo = (-n+1:0)' + (i_dist_t.*n);
403           transitions(foo) = 0;
404           transitions(foo) = max(0, 1 - sum(transitions, 2));
405           clear foo;
406           starts(i_remove) = [];
407           transitions(i_remove,:) = [];
408           transitions(:,i_remove) = [];
409           means(i_remove,:) = [];
410           if discrete,
411             % For output param trimming below
412             meansN(i_remove,:) = [];
413             meansD(:,i_remove) = [];
414             if any_y2,
415               total_occ = sum(meansD);
416               stoch_occ = meansD ./ total_occ;
417             end;
418           else
419             covariances(:,:,i_remove) = [];
420           end;
421           priorsp(i_remove) = [];
```

```
422        logstarts(i_remove) = [];
423        priorsc1(i_remove) = [];
424        priorsc2(i_remove) = [];
425        logtransitions(i_remove,:) = [];
426        logtransitions(:,i_remove) = [];
427        n = n - 1;
428        info(i_remove) = [];
429        if ~isempty(prob_factor),
430           prob_factor(:,i_remove) = [];
431        end;
432        if ~isempty(TtransitionsN),
433           TtransitionsN(i_remove,:) = []; TtransitionsN(:,i_remove) = [];
434        end;
435        if ~isempty(TstartsN),
436           TstartsN(i_remove,:) = []; TstartsN(:,i_remove) = [];
437        end;
438        if ~isempty(TmeansN),
439           TmeansN(i_remove,:) = []; TmeansN(:,i_remove) = [];
440        end;
441        if ~isempty(TmeansD),
442           TmeansD(i_remove,:) = []; TmeansD(:,i_remove) = [];
443        end;
444        if ~isempty(TcovariancesNt),
445           TcovariancesNt(i_remove,:) = []; TcovariancesNt(:,i_remove) = [];
446        end;
447        just_trimmed = 1;
448        if status >= 0,
449           if status > 0, fprintf(2, ' X%d', i_remove); end;
450           trimmed = 1;
451        end;
452     end;
453     clear gpost_pinch g_remove i_remove;
454
455     % Try to trim transitions, preferring to trim self-transitions
456     if ~just_trimmed,
457        % Approximate gain of trimming a transition
458        gpost_any = vprod(d_dist_t, transitions) - gpost_trim_t;
459        % Prevent redistributing to the transition we're trimming
460        gpost_any((-n+1:0)' + (i_dist_t.*n)) = -Inf;
461        % Prefer to trim self-transitions
462        gpost_any((n+1) .* find(diag(gpost_any)>0) - n) = +Inf;
463        % Find the best transitions to trim, if any
464        [g_any, j_anys] = max(gpost_any, [], 2);
465        % Trim at most one transition in each row
466        for i_any = (find(g_any > 0))',
467           % Trim transition i_any -> j_anys(i_any),
468           % redistributing as planned
469           transitions(i_any, j_anys(i_any)) = 0;
470           transitions(i_any, i_dist_t(i_any)) = 0;
471           transitions(i_any, i_dist_t(i_any)) = max(0, ...
472              1 - sum(transitions(i_any, :)));
473           just_trimmed = 1;
474           if status >= 0,
475              if status > 0,
476                 fprintf(2, ' X%d-%d', i_any, j_anys(i_any));
477              end;
478              trimmed = 1;
479           end;
480        end;
481        clear gpost_any g_any i_any j_anys;
482     end;
483
484     % If even that fails, try to trim from starts
485     if ~just_trimmed,
486        % Approximate gain of trimming a start
487        gpost_start = g_dist_s - gpost_trim_s;
488        % Prevent redistributing to the start we're trimming
489        gpost_start(i_dist_s) = -Inf;
490        % Find the best start to trim, if any
491        [g_start, i_start] = max(gpost_start);
492        if g_start > 0,
493           % Trim start i_start, redistributing as planned
494           starts(i_start) = 0;
495           starts(i_dist_s) = 0;
496           starts(i_dist_s) = max(0, 1 - sum(starts));
497           just_trimmed = 1;
498           if status >= 0,
499              if status > 0, fprintf(2, ' X0-%d', i_start); end;
500              trimmed = 1;
501           end;
```

```
502         end;
503         clear gpost_start g_start i_start;
504     end;
505
506     clear dpost_trim_t dpost_trim_s ...
507           dpost_dist_t dpost_dist_s ...
508           gpost_trim_t gpost_trim_s ...
509           d_dist_t i_dist_t d_dist_s i_dist_s g_dist_s;
510
511     % For discrete HMMs, try to trim output parameters as well
512     if discrete & any_y,
513         if y2,
514             yy = y1 + y2 .* stoch_occ';
515         else
516             yy = y1;
517         end;
518         foo = vprod(yy, log(means + REALMIN));
519         bar = vadd (yy, log(means + REALMIN));
520         % Approximate derivative of post wrt means
521         dpost_dist_o = meansN ./ (means - REALMIN) + bar;
522         % Approximate gain of post wrt means
523         gpost_trim_o = meansN + foo .* means;
524         % We can only rely on the approximations above where the
525         % probability delta is small
526         gpost_trim_o(means >= trimepsilon(3)) = Inf;
527         % Holes shall never be redistributed to
528         dpost_dist_o(means == 0) = -Inf;
529         clear yy foo bar;
530         % For each state, pick best output to redistribute to
531         [d_dist_o, i_dist_o] = max(dpost_dist_o, [], 2);
532         % Approximate gain of trimming an output
533         gpost_out = vprod(d_dist_o, means) - gpost_trim_o;
534         % Prevent redistributing to the output we're trimming
535         gpost_out((-n+1:0)' + (i_dist_o.*n)) = -Inf;
536         % Find the best outputs to trim, if any
537         [g_out, j_outs] = max(gpost_out, [], 2);
538         i_outs = find(g_out > 0);
539         % Trim at most one output for each state
540         if ~isempty(i_outs),
541             for i_out = i_outs',
542                 % Trim output i_out -> j_outs(i_out),
543                 % redistributing as planned
544                 means(i_out, j_outs(i_out)) = 0;
545                 means(i_out, i_dist_o(i_out)) = 0;
546                 means(i_out, i_dist_o(i_out)) = max(0, ...
547                     1 - sum(means(i_out, :)));
548                 just_trimmed = 1;
549                 if status >= 0,
550                     if status > 0,
551                         fprintf(2, ' Y%d-%d', i_out, j_outs(i_out));
552                     end;
553                     trimmed = 1;
554                 end;
555             end;
556             % Recompute affected entries in priorsc1
557             foo = means(i_outs, :);
558             priorsc1(i_outs) = sum(foo .* log(foo + REALMIN), 2)';
559             clear foo;
560         end;
561         clear gpost_out g_out i_outs i_out j_outs ...
562               dpost_dist_o gpost_trim_o d_dist_o i_dist_o;
563     end;
564
565     % If we still haven't been able to trim anything, bail out
566     if ~just_trimmed, break; end;
567
568     % Trim states that are incidentally pinched off
569     while n > 1,
570         i_remove = find(~starts & ...
571             ~any(transitions - diag(diag(transitions))));
572         if isempty(i_remove), clear i_remove; break; end;
573         % Pinch off states listed in i_remove; no need to redistribute
574         starts(i_remove) = [];
575         transitions(i_remove,:) = [];
576         transitions(:,i_remove) = [];
577         means(i_remove,:) = [];
578         if ~discrete, covariances(:,:,i_remove) = []; end;
579         priorsp(i_remove) = [];
580         logstarts(i_remove) = [];
581         priorsc1(i_remove) = [];
```

```
582            priorsc2(i_remove) = [];
583            logtransitions(i_remove,:) = [];
584            logtransitions(:,i_remove) = [];
585            n = n - length(i_remove);
586            info(i_remove) = [];
587            if ~isempty(prob_factor),
588              prob_factor(:,i_remove) = [];
589            end;
590            if ~isempty(TtransitionsN),
591              TtransitionsN(i_remove,:) = []; TtransitionsN(:,i_remove) = [];
592            end;
593            if ~isempty(TstartsN),
594              TstartsN(i_remove,:) = []; TstartsN(:,i_remove) = [];
595            end;
596            if ~isempty(TmeansN),
597              TmeansN(i_remove,:) = []; TmeansN(:,i_remove) = [];
598            end;
599            if ~isempty(TmeansD),
600              TmeansD(i_remove,:) = []; TmeansD(:,i_remove) = [];
601            end;
602            if ~isempty(TcovariancesNt),
603              TcovariancesNt(i_remove,:) = []; TcovariancesNt(:,i_remove) = [];
604            end;
605            just_trimmed = 1;
606            if status >= 0,
607              if status > 0, fprintf(2, ' I%d', i_remove); end;
608              trimmed = 1;
609            end;
610          end;
611
612          if status > 0, fprintf(2, ','); end;
613          [transitionsN, transitionsD, startsN, covariancesN, ...
614              meansN, meansD, like] = baumwelch_all(transitions, starts, ...
615              covariances, means, observations, bw_lengths, prob_factor);
616          % Remove states that have zero occupancy
617          dead=find(0==meansD);
618          if any(dead),
619            fprintf(2,'Dead after trim: %d %d %d %d %d %d %d\n',dead);
620            [startsN, transitionsN, meansN, covariancesN]= ...
621              kill_state(dead,startsN, transitionsN, meansN, covariancesN);
622            [starts, transitions, means, covariances]= ...
623              kill_state(dead,starts, transitions, means, covariances);
624            meansD(dead)=[]; transitionsD(dead)=[];
625            if length(priorsc1)>1, priorsc1(dead)=[];end; priorsc2(dead)=[];
626            n = n - length(dead);
627            info(dead) = [];
628            if ~isempty(prob_factor), prob_factor(:,dead) = []; end;
629            % TODO: also kill states in mask matrices: TtransitionsN, etc.
630          end;
631          % Recompute likelihood and posterior
632          if any_z,
633            logtransitions = log(transitions + REALMIN);
634            priorsp = sum(transitions .* logtransitions, 2)';
635            logstarts = log(starts + REALMIN);
636            priors0 = sum(starts .* logstarts);
637            priorp = sum(priorsp) + priors0;
638          end;
639          if any_y1,
640            priorc1 = sum(priorsc1);
641          end;
642          if any_y2,
643            total_occ = sum(meansD);
644            stoch_occ = meansD ./ total_occ;
645            priorsc2 = priorsc1 .* stoch_occ;
646            priorc2 = sum(priorsc2);
647          end;
648          prev_post = post;
649          post = like + zz .* priorp + y1 .* priorc1 + y2 .* priorc2 + priort;
650
651          % Check that the posterior went up
652          % (if not, we have a numerical error)
653          if post < prev_post,
654            if status > 0,
655              fprintf(2, ' error %g,', prev_post - post);
656            end;
657            break;
658          end;
659        end;
660      end;
661      if trimmed, % trimmed implies status >= 0
```

```
662       if status == 0,
663         fprintf(2, ',');
664       end;
665       if discrete,
666         fprintf(2, ' %d[%d,%d,%d] left', n, sum(starts ~= 0), ...
667           sum(sum(transitions ~= 0)), sum(sum(means ~= 0)));
668       else
669         fprintf(2, ' %d[%d,%d] left', n, sum(starts ~= 0), ...
670           sum(sum(transitions ~= 0)));
671       end;
672       trimmed = 0;
673     end;
674     if status == 0,
675       fprintf(2, '\r');
676     elseif status == 1,
677       fprintf(2, '\n');
678     end
679
680     % Apply reestimation transformation matrices, if specified
681     if ~isempty(TtransitionsN), transitionsN = TtransitionsN * transitionsN; end;
682     if ~isempty(TstartsN),      startsN      = TstartsN      * startsN;      end;
683     if ~isempty(TmeansN),       meansN       = TmeansN       * meansN;       end;
684     if ~isempty(TmeansD),       meansD       = TmeansD       * meansD(:);    end;
685     if ~isempty(TcovariancesNt),
686       covariancesN = reshape(reshape(covariancesN, ...
687         d.*d, n) * TcovariancesNt, d, d, n);
688     end;
689
690     % Re-estimate transitions, starts, means and covariances
691     numerrorokay = 0;
692     Otransitions = transitions; Ostarts = starts;
693     for i = 1:n,
694       transitions(i,:) = entropic_map(transitionsN(i,:), zz);
695       if any(transitions(i,:) > 1), keyboard; end;
696     end;
697     starts = entropic_map(startsN, zz);
698     if estoutput,
699       Omeans = means;
700       if discrete,
701         % Re-estimate output multinomials
702         if y2,
703           z = y1 + y2 .* stoch_occ;
704         else
705           z = repmat(y1, 1, n);
706         end;
707         for i = 1:n,
708           means(i,:) = entropic_map(meansN(i,:), z(i));
709         end;
710         if any_y,
711           priorsc1 = sum(means .* log(means + REALMIN), 2)';
712         end;
713         clear z;
714       else %dbstop if naninf
715         % Re-estimate output Gaussians
716         Ocovariances = covariances;
717         if y2,
718           denom = max(1e-20, meansD + y1 + y2 .* stoch_occ);
719         else
720           denom = max(1e-20, meansD + y1);
721         end;
722         iccbreak = 0;
723         for i = 1:n,
724           if meansD(i) > 0,
725             means(i,:) = meansN(i,:) ./ meansD(i);
726           end;
727           [covar, fix_result] = fix_covariances(...
728             covariancesN(:,:,i) ./ denom(i));
729           switch fix_result,
730             case 1,
731               % Ill-conditioned covariances fixed.
732               if status >= 0,
733                 fprintf(2, '*** Ill-conditioned covariances\r');
734               end;
735               numerrorokay = 1; % Ignore numerical errors in next epoch
736             case -1,
737               % Ill-conditioned covariances could not be fixed.
738               if status >= 0,
739                 fprintf(2, '*** Really ill-conditioned covariances\r');
740               end;
741               numerrorokay = 1; % Ignore numerical errors in next epoch
```

```
742          if options.iccabort,
743             iccbreak = 1; % Abort training procedure
744          end;
745        end;
746        covariances(:,:,i) = covar;
747        priorsc1(i) = max(REALMIN,det(covar)); %if priorsc1(i)==0,keyboard;end;
748        if isinf(priorsc1(i))         % Sometimes det() overflows...
749           priorsc1(i)=min(REALMAX,det(covariancesN(:,:,i))./max(REALMIN,denom(i).^d));
750        end;
751      end;
752      if iccbreak, break; end;
753      % We take the absolute value of priorsc1 to get around a numerical
754      % bug in MATLAB that sometimes produces non-positive determinants
755      % for badly conditioned covariance matrices.
756      priorsc1 = -log(abs(priorsc1) + REALMIN)./2 - log2pied2;
757      %dbclear naninf
758     end;
759    end;
760
761    % More pretty pictures
762    if plotting,
763      subplot(2,1,2); cla;
764      show_hmm(means, covariances, observations, transitions);
765      if ~isempty(Movie), Movie(:,epoch) = getframe(gcf); end; %TODO: figure(1)?
766    end;
767
768    % Advance epoch count
769    epochs = epochs + 1;
770  end;
771
772  if plotting,
773    subplot(4,1,1); cla;
774    show_transitions(transitions');    % TODO: Why transpose?
775    if ~isempty(Movie), Movie(:,epoch) = getframe(gcf); end; %TODO: figure(1)?
776  end;
777
778  if epochs > itmax & status >= 0,
779    if status == 0, fprintf(2, '\n'); end;
780    fprintf(2, '=== Terminating after %d epochs%s\n', itmax, CLEAR_EOL);
781  end;
782
783  final = 1;
784  %snapshot hmm 0         % Take final snapshot
785
786  function [s,t,m,c]=kill_state(kill,s,t,m,c)
787  if nargout>0 & nargin>1 & ~isempty(s), s(kill)=[];      end;
788  if nargout>1 & nargin>2 & ~isempty(t), t(kill,:)=[];    t(:,kill)=[]; end;
789  if nargout>2 & nargin>3 & ~isempty(m), m(kill,:)=[];    end;
790  if nargout>3 & nargin>4 & ~isempty(c), c(:,:,kill)=[];  end;

1   function [means, covariances, priors, epochs, post, info] ...
2       = mixture(observations, options, n, means, covariances, priors, info)
3   %MIXTURE Mixture model training.
4   %   [MEANS, COVARIANCES, PRIORS, EPOCHS, POST]
5   %       = MIXTURE(OBSERVATIONS, OPTIONS, N, MEANS, COVARIANCES, PRIORS)
6   %   trains a mixture model of Gaussian distributions.  All input arguments
7   %   except OBSERVATIONS are optional.  Among the output arguments, EPOCHS is the
8   %   number of re-estimation cycles used, and POST is the final log-posterior.
9   %
10  %   OBSERVATIONS is a matrix of input vectors, one per row.  (If OBSERVATIONS is
11  %   a row vector, it is transposed.)
12  %
13  %   OPTIONS specifies additional control parameters; see TOPTIONS for details.
14  %
15  %   N is the number of mixtures in the initial model.  It defaults to the number
16  %   of input vectors.
17  %
18  %   MEANS, COVARIANCES and PRIORS are the parameters of the model.  MEANS
19  %   contains the means of the Gaussian components, one row per component.
20  %   COVARIANCES contains the covariances of the Gaussians, each components
21  %   concatenated together in the third dimension.  PRIORS is a row vector
22  %   containing the mixture prior probabilities.  If omitted from the input
23  %   arguments, they are randomly initialized based on the input vectors.
24  %
25  %   INFO is a cell vector in which each entry is associated with a component in
26  %   the model.  Initially, INFO defaults to {1,2,...,n}, where n is the number
27  %   of components.  If and when components are trimmed, their corresponding
28  %   entries in INFO are also removed.
29  %
30  %   $Id: mixture.m,v 1.22 1998/09/15 22:31:18 shan Exp $
```

```
31
32  % Constants
33  persistent CONSTANTS_INITIALIZED
34  persistent REALMIN CLEAR_EOL
35  if isempty(CONSTANTS_INITIALIZED),
36      REALMIN = realmin;
37      CLEAR_EOL = [27 '[K'];
38      CONSTANTS_INITIALIZED = 1;
39  end;
40
41  % Initialize and check arguments and variables
42  error(nargchk(1, 7, nargin));
43  [t, d] = size(observations);              % Number of input vectors and dimensions
44  if 1 == t,                                % If observations is one-dimensional,
45      observations = observations'; t = d; d = 1; end; % make it a column vector
46  if nargin < 2, options = []; end;
47  options = toptions(options);
48  epsilon = options.epsilon;
49  itmax = options.itmax;
50  z_coef = options.z; any_z = any(z_coef);
51  y_coef = options.y; any_y = any(any(y_coef));
52                      any_y1 = any(y_coef(1,:));
53                      any_y2 = any(y_coef(2,:));
54  any_y1 = any(y_coef(1,:));
55  any_y1 = any(y_coef(1,:));
56  zmax = options.zmax;
57  trimperiod = options.trimperiod;
58  trimratio = options.trimratio;
59  trimcycles = options.trimcycles;
60  status = options.status;
61  schedule = options.schedule;
62
63  % Random model initialization
64  if nargin < 3,
65      % Number of components in mixture
66      n = t;
67  end;
68  % Make sure that n is a positive integer
69  n = max(round(n), 1);
70  if nargin < 4,
71      % Choose random points for means
72      means = observations(randindex(n, t), :);
73  end;
74  if nargin < 5,
75      % Begin with full-data covariances
76      covariances = reshape(kron(randn(1,n) .* 0.01 + 2, ...
77          cov(observations)), [d d n]);
78  end;
79  if nargin < 6,
80      % Random mixture probabilities
81      priors = stoch(randn(1,n) .* 0.01 + 1);
82  end;
83
84  % Initialize info if not given
85  if nargin < 7,
86      info = cell(1, n);
87      for i = 1:n, info{i} = i; end;
88  end;
89
90  % Prepare for EM loop
91  log2pied2 = 1/2 + (d./2).*log(2.*pi);    % A constant
92  epochs = 1;                               % Epoch number
93  px = zeros(t,n);                          % Likelihoods for each input vector and component
94  q = zeros(t,1);                           % Likelihoods for each input vector, or realmin if 0
95  priorp = 0;                               % Negative multinomial entropy
96                                            % (updated iff any_z)
97  priorsp = zeros(1,n);                     % Same, per parameter
98                                            % (updated iff any_z)
99  logpriors = zeros(1,n);                   % Log of priors (or rather, priors + realmin)
100                                           % (updated iff any_z)
101 priorc1 = 0;                              % Negative covariance entropy (unscaled by priors)
102                                           % (updated iff any_y1)
103 priorsc1 = zeros(1,n);                    % Same, per parameter (unscaled by priors)
104                                           % (updated even if ~any_y)
105 for i = 1:n,
106     priorsc1(i) = det(covariances(:,:,i));
107 end;
108 priorsc1 = -log(abs(priorsc1) + REALMIN)./2 - log2pied2;
109 priorc2 = 0;                              % Negative covariance entropy (scaled by priors)
110                                           % (updated iff any_y2)
```

```
111    priorsc2 = zeros(1,n);      % Same, per parameter (scaled by priors)
112                                % (updated iff any_y2)
113    priort = 0;                 % log driving term for temperature
114    Omeans = means;             % Old means
115    Ocovariances = covariances; % Old covariances
116    Opriors = priors;           % Old priors
117    trimmed = 0;                % Whether we trimmed anything this epoch
118                                % (updated iff status >= 0)
119    trimepoch = 1;              % Epoch when we last performed trimming
120    trimpost = NaN;             % Posterior when we last performed trimming
121    numerrorokay = 0;           % Whether to continue even on numerical error
122    snapshot mixture 0          % Take initial snapshot
123
124    % EM loop
125    if status >= 0, fprintf(2, '=== Begin EM loop\n'); end;
126    while epochs <= itmax,
127        if epochs >= 2,
128            snapshot mixture
129            oldpost = post;
130        end;
131
132        % Calculate log-likelihood
133        for i = 1:n,
134            px(:,i) = B3(observations, covariances(:,:,i), means(i,:));
135        end;
136        q = px * priors.';
137        q(q == 0) = REALMIN;
138        like = sum(log(q));
139
140        % Calculate priors on mixture model and component Gaussians
141        if any_z,
142            logpriors = log(priors + REALMIN);
143            priorsp = priors .* logpriors;
144            priorp = sum(priorsp);
145        end;
146        if any_y1,
147            priorc1 = sum(priorsc1);
148        end;
149        if any_y2,
150            priorsc2 = priorsc1 .* priors;
151            priorc2 = sum(priorsc2);
152        end;
153
154        % Re-estimate MAP temperature (or take it from the given fixed schedule)
155        % and compute the exponents zz, y1, and y2
156        if isempty(schedule),
157            temperature = z_coef(2) .* priorp ...
158                + y_coef(1,2) .* priorc1 + y_coef(2,2) .* priorc2;
159        elseif epochs <= length(schedule),
160            temperature = schedule(epochs);
161        else
162            temperature = schedule(end);
163        end;
164        zz = z_coef( 1) + z_coef( 2) .* temperature;
165        if zz > zmax,
166            temperature = (zmax - z_coef(1)) / z_coef(2);
167            zz = zmax;
168        end;
169        y1 = y_coef(1,1) + y_coef(1,2) .* temperature;
170        y2 = y_coef(2,1) + y_coef(2,2) .* temperature;
171        priort = -temperature.^2/2;
172
173        % Calculate log-posterior
174        post = like + zz .* priorp + y1 .* priorc1 + y2 .* priorc2 + priort;
175
176        % Print status
177        if status >= 0,
178            fprintf(2, 'Epoch %3d: %#8g = %#-8g', epochs, post, like);
179            if any_z, fprintf(2, ' %#+-8g*%-g', priorp, zz);
180                else fprintf(2, ' +0'); end;
181            if any_y1, fprintf(2, ' %#+-8g*%-g', priorc1, y1);
182                else fprintf(2, ' +0'); end;
183            if any_y2, fprintf(2, ' %#+-8g*%-g', priorc2, y2);
184                else fprintf(2, ' +0'); end;
185            fprintf(2, ' %+-g @%-g%s', priort, temperature, CLEAR_EOL);
186        end;
187
188        if epochs > length(schedule) & epochs >= 2,
189            % Test for numerical error
190            if post <= oldpost,
```

```
191            if status >= 0,
192                fprintf(2, '\n*** Numerical error %g => %g => %g\n', ...
193                    postbase, oldpost, post);
194            end;
195            if ~numerrorokay,
196                means = Omeans; covariances = Ocovariances; priors = Opriors;
197                post = oldpost;
198                break;                  % Bail out with old parameters
199            end;
200        end;
201
202        % Test for convergence
203        if abs((post - oldpost) ./ (post - postbase)) <= epsilon,
204            if status >= 0,
205                fprintf(2, '\n=== Terminating: %g => %g => %g\n', ...
206                    postbase, oldpost, post);
207            end;
208            break;                      % Bail out with converged parameters
209        end;
210    end;
211
212    % Save initial posterior in postbase
213    if epochs == 1, postbase = post; trimpost = post; end;
214
215    % Trim
216    if (trimperiod & (epochs - trimepoch >= trimperiod)) ...
217     | (trimratio & (epochs >= 2) ...
218            & (abs((post - oldpost) ./ (post - trimpost)) <= trimratio)),
219        for trimcount = 1:trimcycles,
220            trimpost = post;
221            if n <= 1, break; end;
222            % Calculate trimming criterion
223            % Compute the derivative of the log-likelihood
224            % wrt the mixture priors
225            dloglike = sum(vprod(1./q, px));
226            % Approximate the difference that trimming would make in posterior
227            dpost_base = dloglike + zz .* logpriors + y2 .* priorsc1;
228            dpost_trim = dpost_base + y1 .* priorsc1 ./ priors;
229            dpost_dist = dpost_base + zz;
230            clear dpost_base;
231            % Decide which components to trim and distribute to
232            [temp, i_dist] = max(dpost_dist);
233            [temp, i_trim] = min(dpost_trim);
234            if i_dist == i_trim, break; end;
235            % Compute exact increase in posterior and check that it's positive
236            newq = q + (px(:,i_dist) - px(:,i_trim)) .* priors(i_trim);
237            newq(newq == 0) = REALMIN;
238            newlike = sum(log(newq));
239            priors_sum = priors(i_dist) + priors(i_trim) + REALMIN;
240            priorsp_sum = priorsp(i_dist) + priorsp(i_trim);
241            diff = newlike - like ...
242                + zz .* (priors_sum .* log(priors_sum) - priorsp_sum) ...
243                - y1 .* (priorsc1(i_trim)) ...
244                + y2 .* (priorsc1(i_dist)-priorsc1(i_trim)) .* priors(i_trim);
245            clear priors_sum priorsp_sum;
246            if diff <= 0, break; end;
247
248            % Trim and recompute other variables
249            means(i_trim,:) = [];
250            covariances(:,:,i_trim) = [];
251            priors(i_dist) = priors(i_dist) + priors(i_trim);
252            priors(i_trim) = [];
253            n = n - 1;
254            info(i_trim) = [];
255            px(:,i_trim) = [];
256            q = newq;
257            like = newlike;
258            if any_z,
259                logpriors = log(priors + REALMIN);
260                priorsp = priors .* logpriors;
261                priorp = sum(priorsp);
262            else
263                logpriors(i_trim) = [];
264                priorsp(i_trim) = [];
265            end;
266            priorsc1(i_trim) = [];
267            if any_y1,
268                priorc1 = sum(priorsc1);
269            end;
270            if any_y2,
```

```
271                priorsc2 = priorsc1 .* priors;
272                priorc2 = sum(priorsc2);
273            end;
274            prev_post = post;
275            post = like + zz .* priorp + y1 .* priorc1 + y2 .* priorc2 + priort;
276            if status >= 0,
277                if status > 0, fprintf(2, ' X%d(%g)', i_trim, post); end;
278                trimmed = 1;
279            end;
280
281            % Check that the posterior went up
282            % (if not, we have a numerical error)
283            if post < prev_post,
284                if status >= 0,
285                    fprintf(2, '\n*** Trimming error %g => %g\n', ...
286                        prev_post, post);
287                end;
288                break;
289            end;
290        end;
291    end;
292    if trimmed, % trimmed implies status >= 0
293        fprintf(2, ', %d left\n', n);
294        trimmed = 0;
295    elseif status == 0,
296        fprintf(2, '\r');
297    elseif status == 1,
298        fprintf(2, '\n');
299    end;
300
301    % Re-estimate means, covariances and priors
302    numerrorokay = 0;
303    Omeans = means; Ocovariances = covariances; Opriors = priors;
304    if n == 1,
305        % We can't use stochsafe if n == 1, since stochsafe would
306        % operate along the first dimension.
307        gammas = ones(t, 1);
308    else
309        gammas = stochsafe(vprod(priors, px));
310    end;
311    omega = sum(gammas);
312    means = vprod(1 ./ omega.', gammas' * observations);
313    denom = max(1e-20, y1 + y2 .* priors + omega);
314    iccbreak = 0;
315    for i = 1:n,
316        [covar, fix_result] = fix_covariances(wcov(...
317            observations, gammas(:,i), means(i,:), 1) ./ denom(i));
318        switch fix_result,
319        case 1,
320            % Ill-conditioned covariances fixed.
321            if status >= 0,
322                fprintf(2, '*** Ill-conditioned covariances\n');
323            end;
324            numerrorokay = 1; % Ignore numerical errors in next epoch
325        case -1,
326            % Ill-conditioned covariances could not be fixed.
327            if status >= 0,
328                fprintf(2, '*** Really ill-conditioned covariances\n');
329            end;
330            numerrorokay = 1; % Ignore numerical errors in next epoch
331            if options.iccabort,
332                iccbreak = 1; % Abort training procedure
333            end;
334        end;
335        covariances(:,:,i) = covar;
336        priorsc1(i) = det(covar);
337    end;
338    if iccbreak, break; end;
339    % We take the absolute value of priorsc1 to get around a numerical
340    % bug in MATLAB that sometimes produces non-positive determinants
341    % for badly conditioned covariance matrices.
342    priorsc1 = -log(abs(priorsc1) + REALMIN)./2 - log2pied2;
343    priors = entropic_map(omega, zz, y2 .* priorsc1);
344    clear denom omega;
345
346    % Advance epoch count
347    epochs = epochs + 1;
348 end;
349
350 if epochs > itmax & status >= 0,
```

```
351     if status == 0, fprintf(2, '\n'); end;
352     fprintf(2, '=== Terminating after %d epochs%s\n', itmax, CLEAR_EOL);
353 end;
354
355 final = 1;
356 snapshot mixture 0        % Take final snapshot
  1 %B3 compute multivariate Gaussian probabilities
  2 % function out = B3(X,covariance,mean)
  3 %
  4 % multivariate Gaussian; X is a column vector(s)
  5 % takes pains to return a positive value for ill-conditioned covariance matrix
  6
  7 function out = B3(X,covariance,mean)
  8
  9
 10 infs=find(isinf(diag(covariance)));                 % remove dimensions w/infinite variance
 11 if ~isempty(infs)
 12    X(:,infs)=[]; mean(:,infs)=[]; covariance(:,infs)=[]; covariance(:,infs)=[];
 13 end;
 14
 15 % safely get an inverse
 16 if rcond(covariance) < 1e-3, %eps,
 17    icovariance = pinv(covariance);
 18    %dtr = realmin+1./(realmin+abs(det(icovariance)));
 19 else
 20    icovariance = inv(covariance);
 21    %dtr = abs(det(covariance));
 22 end;
 23 icovariance=(icovariance+icovariance')./2;
 24 dtr = realmin+abs(det(covariance));
 25
 26 [T,d] = size(X);
 27 if 1,
 28    X=vadd(-mean,X);
 29    out = min(realmax, ...
 30        max(realmin, ...
 31        exp( -.5 .* abs(sum(((X*icovariance).*X),2))) ...
 32        ./ sqrt((2 .* pi).^d .* dtr)));
 33 else
 34    out = zeros(1,T);
 35    for t=1:T,
 36        x=X(t,:)-mean;
 37        out(t)=x*icovariance*x';
 38    end;
 39    out = exp( -.5 .* out) ./ sqrt((2 .* pi).^d .* dtr + realmin);
 40 end;
  1 function [TransitionsN, TransitionsD, StartsN, CovariancesN, MeansN, MeansD, ...
  2     likelihood] = baumwelch_all(Transitions, Starts, Covariances, Means, ...
  3         Observations, Lengths, ProbFactor)
  4
  5 if nargin<6, Lengths=size(Observations,1); end;
  6
  7 [N,D]        = size(Means);         % # states, # dimensions
  8 points       = sum(Lengths);        % # total # data points
  9 gammas       = zeros(points,N);     % first P(datum|state), later P(state)
 10 TransitionsN = zeros(N);            % accumulators
 11 TransitionsD = zeros(1,N);
 12 StartsN      = zeros(1,N);
 13 if nargout>3,
 14    MeansD    = zeros(1,N);
 15 end;
 16 if points<size(Observations,1),
 17    Observations=Observations(1:points,:);
 18 end;
 19 discrete = isempty(Covariances) & min(size(Observations))==1; % discrete output
 20
 21 % Calculate probabilities for every observation
 22 gammas = hmm_prob_obs_given_state(Observations, Means, Covariances);
 23 if nargin >= 7 & ~isempty(ProbFactor), gammas = gammas .* ProbFactor; end;
 24
 25 base = 1;
 26 likelihood = 0;
 27 for i=Lengths,
 28    [lik,forward,backward,gamma]=fb_analysis(Transitions,Starts,gammas,i,base);
 29
 30    likelihood=likelihood+lik;
 31
 32    P_state = sum(gamma(1:(i-1),:));gammas(base,:);
 33    if nargout>3, MeansD = MeansD + P_state + gamma(i,:); end;
```

```
34
35      % Reestimate Starts
36      StartsN = StartsN + gamma(1,:);
37
38      % Reestimate Transitions
39      TransitionsN = TransitionsN ...
40        +(forward(1:(i-1),:).'...
41        *(gammas(base+1:base+i-1,:).*backward(2:i,:))).*Transitions;
42      TransitionsD = TransitionsD + P_state;
43
44      % replace P(output|state) with P(state) for subsequence just processed
45      if nargout>3, gammas(base:base+i-1,:)=gamma; end;
46      base=base+i;
47    end;
48
49    if nargout>3,
50      if discrete,
51        MeansN = dense(gammas, Observations, D)';
52        CovariancesN = [];
53      else
54        MeansN = gammas.' * Observations;          % estimate weighted means
55        CovariancesN = zeros(D, D, N);
56        for j = 1:N,                               % estimate weighted covariances
57          CovariancesN(:,:,j) = wcov(Observations,gammas(:,j),Means(j,:),1);
58        end;
59      end;
60    end;
61
62    % Show probability assignments of each state for the last sequence
63    global Plotting;
64    if Plotting,
65      subplot(4,1,1);
66      plot(gamma);
67      axis('off');axis([1 Lengths(length(Lengths)) 0 1]);
68      drawnow;
69    end;
70
71
 1    function [theta, loglike] = entropic_map(alpha, z, kappa)
 2    %ENTROPIC_MAP Compute MLE values of theta given alpha.
 3    %    [THETA, LOGLIKE] = ENTROPIC_MAP(ALPHA, Z, KAPPA) uses a fixpoint derived
 4    %    from the Lagrangian of the log-likelihood to compute theta given alpha. The
 5    %    inverse of the fixpoint is used to estimate theta, theta is normalized, and
 6    %    then the fixpoint equation is used to see how far we are from the solution.
 7    %    Convergence usually takes just a few iterations. The output arguments
 8    %    returned are the optimal theta vector and the final log-likelihood value
 9    %
10    %         loglike = sum(alpha .* log(theta))
11    %                      + z .* theta .* log(theta))
12    %                      + theta .* kappa)
13    %
14    %    If unspecified or empty, alpha defaults to 1, while kappa defaults to 0.
15    %
16    %    Warning: this is not numerically stable for sum(alpha) < 1 or large z > 0.
17    %
18    %    $Id: entropic_map.m,v 1.9 1998/08/03 14:32:36 shan Exp $
19
20    % Initialize and check arguments
21    error(nargchk(1, 3, nargin));
22    if any(alpha < 0), error('alpha must be nonnegative'); end;
23    if nargin < 2 | isempty(z), z = 1; end;
24    if nargin < 3 | isempty(kappa), kappa = 0; end;
25
26    % Special case: zero exponent and zero kappa
27    if ~any(z) & ~any(kappa),
28      theta = stoch(alpha);
29      if nargout >= 2, loglike = sum(alpha .* log(theta)); end;
30      return;
31    end;
32
33    % Check for parameters in alpha that are very close to zero
34    % TODO: With z < 0 | any(kappa), we might want to handle zeros in alpha diffly.
35    ok = alpha > eps.^2;
36    if any(ok == 0),
37      q = sum(ok);
38      if q > 1,
39        % Two or more nonzero parameters -- skip those that are zero
40        if length(kappa) > 1, kappa = kappa(ok); end;
41        if length(z    ) > 1, z     = z    (ok); end;
```

```
42         [fix, loglike] = entropic_map(alpha(ok), z, kappa);
43         theta = ok; theta(ok) = stoch(fix); % TODO: why stoch? isn't it redundant?
44      elseif q == 1,
45         % Only one nonzero parameter -- return spike distribution
46         theta = ok;
47         loglike = 0;
48      else
49         % Everything is zero -- return uniform distribution
50         theta = repmat(1/prod(size(alpha)), size(alpha));
51         loglike = 0;
52      end;
53      return
54   end;
55
56   % Trivial case -- only one parameter
57   if length(alpha) == 1,
58      theta = [1];
59      loglike = 1;
60      return
61   end;
62
63   % Constants
64   persistent CONSTANTS_INITIALIZED
65   persistent PHI NPHI REALMAX REALMIN
66   if isempty(CONSTANTS_INITIALIZED),
67      CONSTANTS_INITIALIZED = 1;
68      PHI     = (sqrt(5)-1)./2;
69      NPHI    = 1-PHI;
70      REALMAX = realmax;
71      REALMIN = realmin;
72   end;
73
74   % Fixpoint loop
75   loglike         = -REALMAX;
76   dloglike        = 0;
77   theta           = alpha ./ sum(alpha) + REALMIN;
78   if z == 0,
79      meankappa    = mean(kappa);
80      minlambda    = max(kappa);
81      maxlambda    = +Inf;
82      lambda       = sum(alpha) + meankappa;
83   else
84      alphaz       = alpha./z;
85      kappaz       = kappa./z;
86      logalphaz_pkz = log(alpha) - log(abs(z)) + kappaz;
87      if z < 0,
88         minlambda = max(logalphaz_pkz) - 700;
89      else
90         % For z > 0, we need to restrict minlambda so that the argument to
91         % loglambertwn1 below stays within range
92         minlambda = max(logalphaz_pkz) + 2;
93         minlambda = minlambda * (1 + eps * sign(minlambda));
94      end;
95      maxlambda    = min(logalphaz_pkz) + 700;
96      lambda       = sum(alphaz) + 1 + mean(kappaz) + max(log(theta));
97   end;
98   lambda          = min(maxlambda, max(minlambda, lambda));
99   dlambda         = REALMAX;
100  signz           = sign(z);
101  if minlambda < maxlambda,
102    while 1,
103
104       % Store previous values
105       oldtheta     = theta;
106       oldloglike   = loglike;
107       olddloglike  = dloglike;
108       olddlambda   = dlambda;
109
110       % Step theta (inverse fixpoint)
111       if z == 0,
112          theta = max(alpha ./ (lambda - kappa), 0);
113       elseif z < 0,
114          theta = max(alpha ./ loglambertw0((lambda - 1) - logalphaz_pkz), 0);
115       else
116          theta = max(alpha ./ loglambertwn1((lambda - 1) - logalphaz_pkz), 0);
117       end;
118       theta = theta ./ sum(theta) + REALMIN; % normalize
119       logtheta = log(theta);
120
121       % Compute new entropic MLE log-likelihood
```

```
122      loglike = sum(alpha .* logtheta + z .* theta .* logtheta + theta .* kappa);
123      dloglike = loglike - oldloglike;
124
125      % Compare and save
126      if dloglike == 0,
127        if signz ~= sign(dlambda), break; end;
128        % Back up half a step
129        theta   = oldtheta;
130        loglike = oldloglike;
131        dlambda = dlambda ./ 2;
132        lambda  = lambda - dlambda;
133      elseif dloglike < 0,
134        % Golden mean
135        theta = oldtheta;
136        if olddloglike + dloglike <= 0,
137          loglike = oldloglike;
138          logtheta = log(theta);
139          break;
140        end;
141        loglike = oldloglike;
142        lambda = NPHI .* lambda + PHI .* oldlambda;
143        dlambda = lambda - oldlambda;
144        olddlambda = REALMAX;
145      else
146        % Improvement
147        oldlambda = lambda;
148        if z == 0,
149          lambda = mean(alpha./theta) + meankappa;
150        else
151          lambda = 1 + mean(alphaz./theta) + mean(logtheta);
152        end;
153        lambda = min(maxlambda, max(minlambda, lambda));
154        dlambda = lambda - oldlambda;
155      end;
156    end;
157
158  else
159    % The range of logalphaz_pkz seems totally out of whack -- what the heck,
160    % let's just skip the fixpoint loop
161    logtheta = log(theta);
162  end;
163
164  % Very close now; polish up with 2nd order Newton-Raphson with bisection
165  nm1 = length(theta) - 1;       % n-1
166  nonm1 = 1 + 1/nm1;             % n/(n-1)
167  loglike = sum(alpha .* logtheta + z .* theta .* logtheta + theta .* kappa);
168  while 1,
169
170    % Store previous values
171    oldloglike = loglike;
172    oldtheta = theta;
173
174    % Function we want root of
175    ratio = alpha ./ theta;
176    dtheta = ratio + z .* logtheta + kappa;
177    dtheta = dtheta - mean(dtheta);
178    ddtheta = (z - ratio) ./ theta; % 1st derivative of dtheta
179
180    % 1st order Newton-Raphson via Jacobian
181    jacobian = vadd(-ddtheta ./ nm1, diag(ddtheta .* nonm1));
182    [l,u] = lu(jacobian);
183    if rcond(u) > 0,
184      w = warning; warning off; delta=-(u\(l\(-dtheta')))'; warning(w);
185    else
186      dddtheta = (2.*ratio - z) ./ (theta.^2); % 2nd derivative of dtheta
187      factor = ddtheta.^2 - 2.*dtheta.*dddtheta;
188      if factor >= 0,
189        delta = (ddtheta + sqrt(factor)) ./ dddtheta; % 2nd order Newton-Raphson
190        if delta > theta | sum(abs(delta)) == 0,
191          delta = (ddtheta - sqrt(factor)) ./ dddtheta; % 2nd order Newton-Raphson
192        end;
193        if delta > theta | sum(abs(delta)) == 0,
194          ddtheta(ddtheta == 0) = REALMAX;
195          delta = dtheta ./ ddtheta; % 1st order Newton-Raphson
196        end;
197      else
198        ddtheta(ddtheta == 0) = REALMAX;
199        delta = dtheta ./ ddtheta; % 1st order Newton-Raphson
200      end;
201    end;
```

```
202       % If (omitted) higher-order terms are significant, must scale down delta
203       [problem, where] = max(delta ./ theta);
204       if problem > 1, delta = delta .* (NPHI ./ problem); end;
205       theta = max(theta - delta, 0);
206       theta = theta ./ sum(theta) + REALMIN;
207       logtheta = log(theta);
208       loglike = sum(alpha .* logtheta + z .* theta .* logtheta + theta .* kappa);
209       if loglike <= oldloglike,
210         theta = theta .* NPHI + oldtheta .* PHI;
211         logtheta = log(theta);
212         loglike = sum(alpha .* logtheta + z .* theta .* logtheta + theta .* kappa);
213         if loglike <= oldloglike,
214           theta = oldtheta;
215           loglike = oldloglike;
216           break;
217         end;
218       end;
219     end;
220   end;

1    function x = lambertw0(y)
 2    %LAMBERTW0 Branch 0 of Lambert's W function.
 3    %    X = LAMBERTW0(Y) computes x = W(y), where W is branch 0 of Lambert's W
 4    %    function, such that x * exp(x) = y.  This only works for -1/e <= y.
 5    %
 6    %    $Id: lambertw0.m,v 1.2 1998/06/05 20:51:38 shan Exp $
 7
 8    z=prod(size(y));
 9    if z>1,
10      x=zeros(size(y));
11      for i=1:z, x(i)=lambertw0(y(i)); end;
12      return;
13    end;
14
15    if isinf(y), x=y;
16    elseif y == 0, x = 0;
17    elseif y<-0.36787944117144232159552377016, x = NaN;
18    elseif y==-0.36787944117144232159552377016, x=-1;
19    else
20      if y<0,
21        p=sqrt(2.*(1+2.7182818284590452353602874713E.*y));
22        x=-1+p-p.*p./3+p.*p.*p.*11./72;
23      else
24        x=log(y);
25        if x==0,x=0.56714329040978387299996866221; return; end;
26        if x<0,x=y; else x=abs(log(abs(x))); end;
27      end;
28      oldp=realmax;
29      while 1,            % Halley's method
30        ex = exp(x);
31        p = x.*ex-y;
32        if (0==p)|(abs(p)>=abs(oldp))|(oldp==-p), break; else oldp=p; end;
33        p = p./(ex.*(x+1)-(x+2).*p./(x+x+2));
34        x = x-p;
35      end;
36    end;
37

1    function x = lambertwn1(y)
 2    %LAMBERTWN1 Branch -1 of Lambert's W function.
 3    %    X = LAMBERTWN1(Y) computes x = W(y), where W is branch -1 of Lambert's W
 4    %    function, such that x * exp(x) = y.  This only works for -1/e <= y <= 0.
 5    %
 6    %    $Id: lambertwn1.m,v 1.2 1998/06/05 20:51:38 shan Exp $
 7
 8    s = prod(size(y));
 9    if s > 1,
10      x = zeros(size(y));
11      for i = 1:s, x(i) = lambertwn1(y(i)); end;
12    elseif y < 0,
13      z = log(-y);
14      if z < -1,
15        e = exp(1);
16        % make a first guess
17        if y < -0.02,
18          x = sqrt(2.*(e.*y+1)); % branch point series
19          x = -5/3 - 2/3 .* e .* y - x * (1 + x.^2 * (11/72 + 43/540 .* x));
20        else
21          x = z + log(-z);
22        end;
23
```

```
24      oldp=realmax;
25      while 1,                    % Halley's method
26        ex = exp(x);
27        p = x.*ex-y;
28        if (0==p)|(abs(p)>=abs(oldp))|(oldp==-p), break; else oldp=p; end;
29        p = p./(ex.*(x+1)-(x+2).*p./(x+x+2));
30        x = x-p;
31      end;
32    elseif z == -1,
33      x = -1;
34    else
35      warning(sprintf('lambertwn1 argument out of range: %f', y));
36    end
37  elseif y == 0,
38    x = -Inf;
39  else
40    warning(sprintf('lambertwn1 argument out of range: %f', y));
41    x = NaN;
42  end;
```

```
1  function x = loglambertw0(y)
2  %LOGLAMBERTW0 Branch 0 of Lambert's W function (log).
3  %   LOGLAMBERTW0 computes x = W(exp(-y)), where W is branch 0 of Lambert's W
4  %   function, such that x * exp(x) = exp(-y).
5  %
6  %   $Id: loglambertw0.m,v 1.2 1998/06/05 20:51:38 shan Exp $
7
8  % (MEX version only)
```

```
1  function xx = loglambertwn1(yy)
2  %LOGLAMBERTWN1 Branch -1 of Lambert's W function (log).
3  %   X = LOGLAMBERTWN1(Y) computes x = -W(-exp(-y)), where W is branch -1 of
4  %   Lambert's W function, such that x * exp(-x) = exp(-y).
5  %
6  %   $Id: loglambertwn1.m,v 1.2 1998/06/05 20:51:38 shan Exp $
7
8  siz = size(yy);
9  xx = zeros(siz);
10 for i = 1:prod(siz)
11   y = yy(i);
12   if y > 1,
13     if y < 20,
14       xx(i) = -lambertwn1(-exp(-y));
15     elseif y == Inf,
16       xx(i) = Inf;
17     else
18       % make a first guess
19       if y < 1.5,
20         x = sqrt(2.*(y-1)); % branch point series
21         x = ((((((1/204120.*x-139/5443200).*x+1/17010) ...
22              .*x+1/4320).*x-1/270).*x+1/36).*x+1/3).*x+1).*x+1;
23       else
24         x = y + log(y);
25       end;
26       oldx = 0;
27       while abs(oldx - x) > realmin,
28         oldx = x;
29         x = y + log(x);
30       end;
31       xx(i) = x;
32     end;
33   elseif y == 1,
34     xx(i) = 1;
35   else
36     warning(sprintf('loglambertwn1 argument out of range: %f', y));
37     xx(i) = NaN;
38   end;
39 end;
```

```
1  function show_hmm(Means,Covariances,Data,Transitions,d1,d2)
2  % Visualize the state of an hmm.
3  % Transition probabilities are shown as a half-line runnng into each
4  % cluster.  The thicker the line, the higher the conditional probability.
5  % Output probabilities are shown as Gaussian density isocontours.
6  % The data is shown as a scatterplot of dots.  You can choose which
7  % dimensions to project onto the plane (defaults to 1 & 2).
8
9  if nargin<6, d1=1; end;
10 if nargin<5, d2=2; end;
11 if nargin<4, Transitions=[]; end;
12 [n,d]=size(Means);
```

```
13    colors = get(gca,'ColorOrder');
14    nc=size(colors,1);
15    offset=(max(Means(:,d1))-min(Means(:,d1)))./20;
16
17    if ~isempty(Data), plot(Data(:,d1),Data(:,d2), 'm.'); hold on;
18    if ~isempty(Means),
19      %cla
20      if ~isempty(Transitions),
21        for i=1:n,
22          from = Means(i,[d1 d2]);
23          for j=1:n,
24            if ~(j==i),
25              to = Means(j, [d1 d2]);
26              to = [from; mean([from;to])];
27              width = Transitions(i,j).*20;
28              %width = max(width,1);                    % TEMPORARY
29              if width>=1,
30                line(to(:,1), to(:,2), ...
31                    'LineWidth', width, 'Color', colors(1+rem(j-1,nc),:));
32              elseif width>0,
33                line(to(:,1), to(:,2), ...
34                    'LineStyle', ':', 'Color', colors(1+rem(j-1,nc),:));
35              end;
36              hold on;
37            end;
38          end;
39        end;
40      end;
41      if ~isempty(Covariances),
42        for i = 1:n,
43          if isempty(Transitions), center=0;
44          else center = max(0.5,Transitions(i,i).*20); end;
45          plotGauss(Means(i,d1),Means(i,d2),Covariances(d1,d1,i), ...
46                    Covariances(d2,d2,i),Covariances(d1,d2,i), ...
47                    colors(1+rem(i-1,nc),:),center);
48          hold on;
49        end;
50      end;
51      c=0.1.*offset;
52      for i = 1:n,
53        text(Means(i,d1)+offset+c,Means(i,d2)-c,sprintf('%d',i),'color','white');
54        text(Means(i,d1)+offset,Means(i,d2),sprintf('%d',i),'color','black');
55      end;
56    end;
57    axis([min(Data(:,d1)), max(Data(:,d1)), min(Data(:,d2)), max(Data(:,d2))]);
58    end;
59    axis('off');
60    drawnow;
61    hold off;
62
63
64
65

1    function optsout = toptions(optsin)
 2    %TOPTIONS Default option settings used by the entropic training routines.
 3    %   The OPTIONS input argument to MIXTURE and HMM is a cell array or structure
 4    %   argument specifying additional control parameters.  If OPTIONS is a cell
 5    %   array, each pair of elements is treated as the name and value of an option.
 6    %   If OPTIONS is a structure, each field is treated as an option specification.
 7    %   If OPTIONS is an empty array, default values are used for all options;
 8    %   otherwise, the option values specified override default values.
 9    %
10    %   The 'epsilon' option is the smallest allowable gain in the posterior between
11    %   successive epochs before training is terminated, as a fraction of the gain
12    %   in the posterior between the first and current epochs.  The default is
13    %   0.0001.
14    %
15    %   The 'itmax' option is the maximum number of epochs allowed before training
16    %   is terminated.  It defaults to +Inf (i.e., no termination due to number of
17    %   epochs).
18    %
19    %   The 'z' option (a vector of length 2) and the 'y' option (a square matrix of
20    %   size 2) are constants the log posterior probability distribution function,
21    %   namely
22    %
23    %        post = (probability of observations given model)
24    %             - zz * (entropy of mixture prior probabilities [mixture]
25    %                  or state transition and starting probabilities [hmm])
26    %             - y1 * (total entropy of Gaussians [mixture or continuous hmm]
```

```
 27  %                  or output probabilities [discrete hmm], _unscaled_ by
 28  %                  mixture priors [mixture] or state occupancy [hmm])
 29  %           - y2 * (total entropy of Gaussians [mixture or continuous hmm]
 30  %                  or output probabilities [discrete hmm], _scaled_ by
 31  %                  mixture priors [mixture] or state occupancy [hmm])
 32  %           - temperature^2/2,
 33  %
 34  %  in which
 35  %
 36  %      zz = z( 1) + z( 2) * temperature,
 37  %      y1 = y(1,1) + y(1,2) * temperature,
 38  %      y2 = y(2,1) + y(2,2) * temperature,
 39  %
 40  %  and temperature is the deterministic annealing temperature.  Special cases
 41  %  of the 'z' and 'y' options include:
 42  %
 43  %      (a) 'z' = [0 0], 'y' = [0 0; 0 0]: maximum likelihood.
 44  %      (b) 'z' = [1 0], 'y' = [0 0; 0 0]: minimum entropy of mixture priors
 45  %          [mixture] or state transitions [hmm].
 46  %      (c) 'z' = [1 0], 'y' = [1 0; 0 0]: minimum entropy of model desciption.
 47  %      (d) 'z' = [1 0], 'y' = [0 0; 1 0]: minimum entropy of prob distribution.
 48  %      (e) 'z' = [barrier 1/sqrt(scale)], 'y' = [barrier 1/sqrt(scale); 0 0]:
 49  %          similar to (c), plus annealing with a schedule determined from the
 50  %          model description entropy by the driving function
 51  %              log(delta(zz)) = -scale*(zz-barrier)^2/2 = -temperature^2/2.
 52  %      (f) 'z' = [barrier 1/sqrt(scale)], 'y' = [barrier 0; 0 1/sqrt(scale)]:
 53  %          similar to (e), but with an annealing schedule determined from the
 54  %          probability distribution entropy instead.
 55  %
 56  %  The default for 'z' and 'y' is special case (c) above.
 57  %
 58  %  The 'zmax' option specifies a maximum value for zz.  If the annealing
 59  %  temperature causes
 60  %
 61  %      zz = z(1) + z(2) * temperature
 62  %
 63  %  to rise above 'zmax', the temperature is clamped to fix zz at 'zmax'.  The
 64  %  default for 'zmax' is 1; it can also be set to +Inf.
 65  %
 66  %  By default, the temperature is estimated every epoch to maximize the
 67  %  posterior, just like every other parameter.  If the 'schedule' option is
 68  %  specified to be a non-empty vector, it is used as a fixed annealing
 69  %  schedule.  Each entry in 'schedule' is taken as the temperature for the
 70  %  corresponding epoch.  When the epoch number exceeds the length of
 71  %  'schedule', the temperature is set to the last entry in 'schedule'.
 72  %
 73  %  The 'trimperiod' option (a non-negative integer) and the 'trimratio' option
 74  %  (a non-negative real number) determine whether and how often to trim.
 75  %  Trimming is performed whenever one of two criteria is satisfied:  (1)
 76  %  'trimperiod' is nonzero, and the current epoch is 'trimperiod' epochs since
 77  %  the last epoch when trimming took place.  (2) 'trimratio' is nonzero, and
 78  %  the posterior increase since the previous epoch is less than 'trimratio'
 79  %  times the posterior increase since the last epoch when trimming took place.
 80  %  Both of these options default to zero.
 81  %
 82  %  The 'trimepsilon' option (a non-negative number) restricts trimming to
 83  %  parameter values (e.g., transition probabilities) that are smaller than or
 84  %  equal to 'trimepsilon'.  The default is +Inf.  This option is currently only
 85  %  implemented by HMM, for which it should probably be set to something like
 86  %  1e-6.  For HMM, if 'trimepsilon' is set to a vector of length 2 or 3, the
 87  %  entries of the vector are taken as separate 'trimepsilon' settings for
 88  %  trimming starting probabilities, transition probabilities, and (for discrete
 89  %  models only) output probabilities.
 90  %
 91  %  The 'trimcycles' option (a positive integer) is the maximum number of
 92  %  trimming cycles in each epoch, i.e., the maximum number of times trimming
 93  %  can be performed before moving on to the M-step.  The default is +Inf.
 94  %
 95  %  The 'status' option controls how status messages are printed:
 96  %
 97  %      1 for one line per epoch (the default),
 98  %      0 for every epoch on the same line unless something special happens,
 99  %      -1 for no status messages;
100  %
101  %  The 'plotting' boolean option determines whether the status of epoch should
102  %  be plotted.  The default is no.  If this option is set to true and the
103  %  global variable Movie is not empty, the status of each epoch is stored in
104  %  the Movie variable as consecutive movie frames.  This parameter is currently
105  %  only implemented by HMM.
106  %
```

```
107  %   The 'estoutput' boolean option determines whether the output parameters
108  %   (i.e., MEANS and COVARIANCES) are reestimated.  The default is yes.  This
109  %   option is currently only implemented by HMM.
110  %
111  %   The 'iccabort' boolean option determines whether the training procedure
112  %   should simply abort if it has repeatedly tried and failed to fix an
113  %   ill-conditioned covariance matrix.  The default is no.
114  %
115  %   The 'TtransitionsN', 'TstartsN', 'TmeansN', 'TmeansD', 'TcovariancesN'
116  %   options for HMM specify a transformation to be applied to the results of
117  %   forward-backward analysis before reestimating model parameters.  Each
118  %   transformation is specified as a square matrix whose size is the number of
119  %   HMM states; the corresponding variable is multiplied by the square matrix on
120  %   the left.
121  %
122  %   $Id: toptions.m,v 1.11 1998/09/14 22:00:59 shan Exp $
123
124  if isempty(optsin), optsin = {}; end;
125
126  optsout = struct_params(optsin,                  ...
127            'epsilon',        0.0001,              ...
128            'itmax',          +Inf,                ...
129            'z',              [1 0],               ...
130            'y',              [1 0; 0 0],          ...
131            'zmax',           1,                   ...
132            'schedule',       [],                  ...
133            'trimperiod',     0,                   ...
134            'trimratio',      0,                   ...
135            'trimepsilon',    +Inf,                ...
136            'trimcycles',     +Inf,                ...
137            'status',         1,                   ...
138            'plotting',       0,                   ...
139            'estoutput',      1,                   ...
140            'iccabort',       0,                   ...
141            'TtransitionsN',  [],                  ...
142            'TstartsN',       [],                  ...
143            'TmeansN',        [],                  ...
144            'TmeansD',        [],                  ...
145            'TcovariancesN',  []);

1  function [logpstar,istar,delta,logP] = viterbi(Transitions,Starts,Means,Covariances,Observations)
 2  % Viterbi algorithm.  Unless you want 3 or 4 output arguments, you probably
 3  % want to use VITERBI_LITE instead, which is written in C and much faster.
 4
 5  [N,N] = size(Transitions);
 6  [T,d] = size(Observations);
 7
 8  logP = log_quiet(hmm_prob_obs_given_state(Observations, Means, Covariances));
 9  logA = log_quiet(Transitions);
10
11  % Initialization
12  delta = zeros(T,N); psi = zeros(T,N);
13  delta(1,:) = log_quiet(Starts) + logP(1,:);
14
15  % Recursion
16  for t = 2:T
17    for j = 1:N
18      [maxp,psi(t,j)] = max(delta(t-1,:) + logA(:,j)');
19      delta(t,j) = maxp + logP(t,j);
20    end
21  end
22
23  % Termination
24  [logpstar,maxi] = max(delta(T,1:N));
25  istar(T) = maxi;
26
27  % Path backtracking
28  for t = (T - 1):-1:1
29    istar(t) = psi(t+1,istar(t+1));
30  end 1  function ret = hmm_prob_obs_given_state(observations, means, covariances)
 2  %HMM_PROB_OBS_GIVEN_STATE Probabilities of observations given states in HMM.
 3  %   HMM_PROB_OBS_GIVEN_STATE(OBSERVATIONS, MEANS, COVARIANCES) computes the
 4  %   probability of each observation given in OBSERVATIONS conditional on each
 5  %   state in the HMM model given by MEANS and COVARIANCES.
 6  %
 7  %   $Id: hmm_prob_obs_given_state.m,v 1.1 1998/08/03 14:06:14 shan Exp $
 8
 9  n = size(means, 1);
10  if isempty(covariances),
```

```
11      % Discrete case
12      ret = zeros(length(observations), n);
13      for j = 1:n,
14          ret(:, j) = means(j, observations)';
15      end;
16  else
17      ret = zeros(size(observations, 1), n);
18      for j = 1:n,
19          ret(:, j) = B3(observations, covariances(:,:,j), means(j,:));
20      end
21  end 1   function [loglike,loglikes,perplexity,perplexities,symbol_perplexity] = hmm_loglike(Transitions,Starts,Means,Covariances,Observ
2
3   % loglike -- mean log-likelihood per point
4   % loglikes -- vector of sequence log-likelihoods
5   % perplexity -- state perplexity
6   % perplexities -- state perplexity per sequence
7   % symbol_perplexity -- for discrete HMMs, output symbol perplexity
8
9   loglike=0;
10  [n_states,n_states] = size(Transitions);
11  timesteps = length(Observations);
12  D=size(Observations,2);
13  P_obs_given_state=zeros(timesteps,n_states);
14  discrete = isempty(Covariances) & min(size(Observations))==1;
15  % Calculate probabilities for every observation
16  P_obs_given_state = hmm_prob_obs_given_state(Observations, Means, Covariances);
17
18  total_pts=0;
19  loglikes=zeros(1,size(begin_ends,1));
20  if nargout>=3, perplexity=0; perplexities=zeros(1,size(begin_ends,1)); end;
21  if discrete & nargout=5, symbol_perplexity = 0; end;
22  for i=1:size(begin_ends,1),
23      b=begin_ends(i,1);
24      l=begin_ends(i,2)-b+1;
25      total_pts=total_pts+l;
26      if nargout<3
27          loglikes(i)=fb_analysis(Transitions,Starts,P_obs_given_state,l,b);
28      else
29          [loglikes(i),i1,i2,occ]=fb_analysis(Transitions,Starts,P_obs_given_state,l,b);
30          perplexities(i) = -mean(sum(occ.*log(occ+realmin),2));
31          perplexity=perplexity+perplexities(i).*l;
32          if discrete & nargout>=5,
33              k=occ*Means;
34              symbol_perplexity = symbol_perplexity-sum(sum(k.*log(k+realmin),2));
35          end;
36      end;
37  end;
38  loglike=sum(loglikes)./total_pts;
39  if nargout>=3, perplexity=exp(perplexity./total_pts); end;
40  if nargout>=4, perplexities=exp(perplexities); end;
41  if discrete & nargout>=5, symbol_perplexity = exp(symbol_perplexity./total_pts); end;
42

1   function p=stoch(p)
2
3   % Row-normalize matrices, making sure rows are positive and sum to 1
4
5   if ndims(p)>2, error('Can only normalize matrices and vectors'); end;
6   p=abs(p);
7   [r,c]=size(p);
8   if min(r,c)>1,
9       q=sum(p,2);                                     % row sums
10      if any(q==0) keyboard; end;
11      w=warning;warning('off');
12      p=vprod(1./q,p);
13      warning(w);
14      if ~all(q),
15          p(isnan(p))=1./c;
16      end;
17  else
18      q=sum(p);
19      if q==0,
20          p=p+1./max(r,c);
21      else
22          p=p./q;
23      end;
24  end;

1   function res=vadd(a,b)
```

```
2
3   % Add a and b.
4   % If they differ in dimension, repeatedly add one to the other.
5   % Assumes that the smaller operand is a vector.
6
7
8
9   [r1,c1]=size(a);
10  [r2,c2]=size(b);
11  r=max(r1,r2);
12  c=max(c1,c2);
13
14  if r1==r2,
15    res=zeros(r,c);
16    if r<c,
17      for i=1:r1, res(i,:)=a(i,:)+b(i,:); end;
18    elseif c1==c2
19      res=a+b;
20    elseif c1==1,
21      for i=1:c2, res(:,i)=b(:,i)+a; end;
22    else
23      for i=1:c1, res(:,i)=a(:,i)+b; end;
24    end
25  elseif c1==c2,
26    res=zeros(r,c);
27    if c<r,
28      for i=1:c1, res(:,i)=a(:,i)+b(:,i); end;
29    elseif r1==1,
30      for i=1:r2, res(i,:)=b(i,:)+a; end;
31    else
32      for i=1:r1, res(i,:)=a(i,:)+b; end;
33    end
34  elseif (r1==1)&(c2==1),
35    res=tsum(b,a);
36  elseif (r2==1)&(c1==1),
37    res=tsum(a,b);
38  else error('vadd: incompatible sizes');
39  end;

1   function res=vprod(a,b)
2
3   % Multiply a and b elementwise.
4   % If they differ in dimension, repeatedly multiply one to the other.
5   % Assumes that the smaller operand is a vector.
6
7
8   [r1,c1]=size(a);
9   [r2,c2]=size(b);
10  r=max(r1,r2);
11  c=max(c1,c2);
12
13  if r1==r2,
14    res=zeros(r,c);
15    if r<c,
16      for i=1:r1, res(i,:)=a(i,:).*b(i,:); end;
17    elseif c1==c2
18      res=a.*b;
19    elseif c1==1,
20      for i=1:c2, res(:,i)=b(:,i).*a; end;
21    else
22      for i=1:c1, res(:,i)=a(:,i).*b; end;
23    end
24  elseif c1==c2,
25    res=zeros(r,c);
26    if c<r,
27      for i=1:c1, res(:,i)=a(:,i).*b(:,i); end;
28    elseif r1==1,
29      for i=1:r2, res(i,:)=b(i,:).*a; end;
30    else
31      for i=1:r1, res(i,:)=a(i,:).*b; end;
32    end
33  elseif (r1==1)&(c2==1),
34    res=b*a;
35  elseif (r2==1)&(c1==1),
36    res=a*b;
37  else error('vprod: incompatible sizes');
38  end;

1   function [likelihood,forward,backward,occupation]= ...
2     fb_analysis(Transitions,Starts,P_obs_giv_state,timesteps,first);
3
```

```
4  %  Forward-Backward analysis on an HMM.
5  %dbstop if naninf
6  n_states=length(Starts);
7  if nargin<4, timesteps=size(P_obs_giv_state,1); end;
8  if nargin<5, first = 1; end;
9  offset=first-1;
10 awful=realmax./256;
11 % Calculate the forward variable
12 forward = zeros(timesteps,n_states); c = zeros(1,timesteps);        % for speed
13 forward(1,:) = Starts .* P_obs_giv_state(1,:);
14 c(1) = 1./sum(forward(1,:));
15 forward(1,:) = c(1) .* forward(1,:);
16 for t = 2:(timesteps)
17   forward(t,:) = (forward(t-1,:) * Transitions) .* P_obs_giv_state(offset+t,:);
18   q=sum(forward(t,:));
19   if q>0,
20     c(t) = 1./q;
21     forward(t,:) = c(t) .* forward(t,:);
22   else              % trick to protect against near-zero output probs
23     c(t) = awful;
24     forward(t,:) = forward(t-1,:) * Transitions;
25   end;
26 end
27
28 likelihood=-sum(log(c+(c==0)*realmin));
29
30 if (nargout<3) return; end;
31
32 % Calculate the backward variable
33 backward = zeros(timesteps,n_states);
34 backward(timesteps,:) = c(timesteps).*ones(1,n_states);
35 for t = (timesteps-1):-1:1
36   backward(t,:)=min(realmax,(Transitions*(backward(t+1,:) .* P_obs_giv_state(offset+t+1,:)).').'.*c(t));
37 end
38
39
40 % Calculate occupation table
41 % occupation(T,N) = probability of the sequence given state N at time T.
42 occupation = forward .* backward ;
43 % necessary adjustment for scaling
44 for t = 1:timesteps
45   occupation(t,:) = occupation(t,:) ./ (c(t)+realmin);
46 end
47
48 dbclear naninf
1  function [c,m]=wcov(X,w,m,flag)
2  % function [covariance,mean]=wcov(data,weights,mean,flag)
3  %
4  % Calculate a weighted covariance around a given mean.  Divides by n-1 to
5  % yield the best unbiased estimate.  Since this is not the MMSE estimate,
6  % you can suppress division with the flag.
7  %
8  % data -- stacked vectors
9  % weights -- optional weights (default is all 1's)
10 % mean -- optional mean (default is sample mean of weighted data)
11 % flag -- if true, don't divide result by # of data points
12
13 num=length(X);
14 if nargin<2, w=ones(num,1); end;
15 if nargin<4, flag=0; end;
16 if nargin<3, m=vprod(w,X)./sum(w); end;       % mean of weighted data
17
18 X = vadd(-m,X);                                % subtract mean from each row
19 c = X.' * vprod(w,X);                          % get gross covariance
20 c=(c+c.')./2;
21
22 if ~flag, c=c./(sum(w)-1); end;               % normalize
```

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for generating realistic facial animation directly from speech, comprising the steps of:

learning dynamical models of facial and vocal action from observations of a face and facial gestures made while an individual is speaking whereby voice is analyzed with regard to learned categories of facial gestures and whereby long term dependencies including facial-co-articulation are implicitly modeled;

generating sequences of facial gestures to accompany newly input audio; and, converting said sequences into optimal sequences of facial parameters; and, driving facial animation with said facial control parameters; and wherein the step generating sequences of facial gestures includes using a hidden Markov model to learn the dynamics and essential states of the face as said individual speaks, to learn mappings from states to facial poses, to learn mapping from said states to acoustic features extracted from said individual's speech, to analyze newly input speech to obtain an optimally compatible sequence of facial states, and to convert said sequence of facial states into an optimal trajectory through the possible facial poses of an animated face corresponding to how the individual's face would move while speaking said newly input audio.

2. The method of claim 1 wherein said hidden Markov model is trained via an entropy minimization technique, whereby it becomes possible to extract optimal state sequences and whereby it is possible to learn an optimal model of facial states and dynamics without preconceived notion as to the structure and parameters of said model.

3. The method of claim 1 wherein the step of converting the state sequences into optimal sequences of facial control parameters includes the step of assigning probabilities to all possible facial motion trajectories and choosing the most likely trajectory to permit generation of the most realistic animation.

4. The method of claim 3, wherein the step of assigning probabilities includes the step of deriving said probabilities from a hidden Markov model.

5. A method for generating realistic facial animation directly from speech comprising the steps of:

providing video frame images and a synchronized audio file of an individual talking;

entropically training a facial hidden Markov model on said video so as to induce a facial state machine having facial states and the mapping of said facial states to facial configurations;

estimating mappings from said facial states to audio features to provide a vocal hidden Markov model having facial dynamics, but driven by audio-to-audio sequences;

predicting facial states from new audio using said vocal hidden Markov model to provide an optimal facial state sequence;

combining said facial state sequence with said facial mappings to provide an optimal trajectory through said facial configuration space; and, generating a sequence of animation control parameters therefrom.

6. A method for generating facial animation, comprising:

identifying, from a plurality of first audio features which are mapped to associated first facial states, those of the first audio features which correspond to second audio features;

identifying the first facial states associated with the identified first audio features; and generating a facial animation corresponding to the second audio features using the identified first facial state;

wherein the identifying of the first facial states includes identifying a sequence of the predicted first facial states, and identifying a trajectory through the identified sequence of predicted first facial states; and wherein the identified first facial states are those of the predicted first facial states within the identified sequence which are along the identified trajectory.

7. The method of claim 6, wherein:

the identified trajectory is a maximum probable trajectory through the identified sequence of predicted first facial states.

8. A method for generating facial animation, comprising:

identifying, from a plurality of first audio features which are mapped to associated first facial states, each of the first facial states corresponding to a facial expression, those of the first audio features which correspond to second audio features;

identifying the first facial states associated with the identified first audio features;

identifying average facial expressions from the facial expressions corresponding to the identified first facial states; and generating a facial animation, using the identified first facial state, which corresponds to the second audio features and represents the identified average facial expressions.

9. A method for generating facial animation, comprising:

identifying, from a plurality of first audio features which are mapped to associated first facial states, those of the first audio features which correspond to second audio features;

identifying the first facial states associated with the identified first audio features;

generating a facial animation corresponding to the second audio features using the identified first facial state;

generating a facial hidden Markov model representing the first facial states; and generating a vocal hidden Markov model representing a mapping of the first facial states with the associated first audio features;

wherein the first audio features which correspond to the second audio features are identified using the vocal hidden Markov model and the first facial states associated with the identified first audio features are identified using the facial hidden Markov model.

10. The method of claim 9, further comprising the steps of:

entropically training the facial hidden Markov model; and entropically training the vocal hidden Markov model;

wherein the first audio features which correspond to the second audio features are identified using the entropically trained vocal hidden Markov model and the first facial states associated with the identified first audio features are identified using the entropically trained facial hidden Markov model.

11. A method for generating facial animation, comprising:

identifying, from a plurality of first audio features which are mapped to associated first facial states, those of the first audio features which correspond to second audio features;

identifying the first facial states associated with the identified first audio features; and generating a facial animation corresponding to the second audio features using the identified first facial state;

wherein the first facial states represent contextual information associated the first audio features.

12. The method of claim 11, wherein:

one of the first facial states is associated with the first audio features occurring in a first time period; and the contextual information represented by the one first facial state is associated with the first audio features occurring in a second time period which at least one of before and after the first time period.

13. A method for generating facial animation, comprising:

identifying, from a plurality of first audio features which are associated with a training audio and are mapped to associated first facial states, those of the first audio features which correspond to second audio features;

identifying the first facial states associated with the identified first audio features;

generating a facial animation corresponding to the second audio features using the identified first facial state;

tracking facial features presented in a training video synchronized to the training audio;

generating the first facial states using the tracked facial features; and determining which of the tracked facial features would most probably have been presented in the training video if the training audio included the second audio features;

wherein the identified first facial states are identified based upon the tracked facial features determined to most probably have been presented.

14. An article of manufacture for generating facial animation, comprising:

a computer readable storage medium; and computer programming stored on the medium, wherein the stored computer programming is configured to be readable from the medium by a computer and thereby cause the computer to operate so as to:

identify facial poses and associated facial dynamics presented in a training video, which correspond to first audio features presented in a training audio synchronized to the training video;

generate a facial hidden Markov model representing the facial dynamics mapped to the associated facial poses; and generate a vocal hidden Markov model representing the facial poses mapped to the corresponding first audio features;

wherein second audio features which correspond to the first audio features are mappable to the corresponding first facial poses using the vocal hidden Markov model and the first poses mapped to the corresponding second audio features are mappable to the associated facial dynamic using the facial hidden Markov model to generate a facial animation.

15. An article of manufacture according to claim 14, wherein the stored computer programming is further configured to cause the computer to operate so as to:

entropically train the facial hidden Markov model; and entropically train the vocal hidden Markov model;

wherein the entropically trained vocal hidden Markov model is usable for the mapping of the second audio features and the entropically trained facial hidden Markov model is usable for the mapping of the first poses mapped to the corresponding second audio features.

16. An article of manufacture according to claim 14, wherein:

the facial poses represent facial expressions and include pose segments associated with different regions of a face; and the facial dynamics include transition probabilities from one of the facial expressions to another of the facial expressions.

17. An article of manufacture for generating facial animation, comprising:

a computer readable storage medium; and computer programming stored on the medium, wherein the stored computer programming is configured to be readable from the medium by a computer and thereby cause the computer to operate so as to:

identify first audio features from a non-phonemic training audio representation which correspond to second audio features of a new non-phonemic audio representation;

identify a sequence of predicted facial states from a training video associated with the identified first audio features;

identify a trajectory through the identified sequence of predicted facial states;

identify facial states within the identified sequence of predicted facial states along the identified trajectory; and generate a facial animation corresponding to the second audio features using the identified facial states.

18. An article of manufacture according to claim 17, wherein:

the identified trajectory is a maximum probable trajectory through the identified sequence of predicted facial states.

19. A method for generating facial animation, comprising the steps of:

identifying facial poses and associated facial dynamics presented in a training video, which correspond to first audio features presented in a training audio synchronized to the training video;

generating a facial hidden Markov model representing the facial dynamics mapped to the associated facial poses; and generating a vocal hidden Markov model representing the facial poses mapped to the corresponding first audio features;

wherein second audio features which correspond to the first audio features are mappable to the corresponding first facial poses using the vocal hidden Markov model and the first poses mapped to the corresponding second audio features are mappable to the associated facial dynamic using the facial hidden Markov model to generate a facial animation.

20. A method according to claim 19, further comprising the steps of:
- entropically training the facial hidden Markov model; and
- entropically training the vocal hidden Markov model;
- wherein the entropically trained vocal hidden Markov model is usable for the mapping of the second audio features and the entropically trained facial hidden Markov model is usable for the mapping of the first poses mapped to the corresponding second audio features.

21. A method according to claim 19, wherein:
- the facial poses represent facial expressions and include pose segments associated with different regions of a face; and
- the facial dynamics include transition probabilities from one of the facial expressions to another of the facial expressions.

22. A method for generating facial animation, comprising:
- identifying first audio features from a training audio which correspond to second audio features of a new audio;
- identifying a sequence of the predicted facial states from a training video associated with the identified first audio features;
- identifying a trajectory through the identified sequence of predicted facial states;
- identifying facial states within the identified sequence of along the identified trajectory; and
- generating a facial animation corresponding to the second audio features using the identified facial states.

23. A method according to claim 22, wherein:
- the identified trajectory is a maximum probable trajectory through the identified sequence of predicted facial states.

24. A method for generating realistic facial animation directly from an audio signal, comprising:
- learning a model of facial states from observations of a face while a person is generating a training audio signal;
- relating the training audio signal to the facial states;
- generating a sequence of facial states in relation to an input audio signal based on a correspondence of the input audio signal to the training audio signal;
- converting the sequence of facial states into control parameters; and
- driving facial animation with the control parameters; and
- wherein the model is a hidden Markov model including transition dynamics for controlling transitions between the facial states; and
- wherein the transition dynamics include an average duration of each facial state, a likelihood of each potential successor facial state, and information representing potential past and future facial states carried forward and backward in time used for enforcing long-term dependencies between the facial states.

25. The method of claim 24, wherein the facial states represent facial gestures including both independent and coordinated motions of facial features.

26. The method of claim 24, wherein the facial features include lips, eyebrows, jaws, cheeks, and ears.

27. The method of claim 24, wherein the facial states include information representing facial poses, facial motions, and correlation between the facial poses and the facial motions.

28. The method of claim 24, further comprising:
- measuring a predictiveness of the model as negative entropy; and
- minimizing the entropy to optimize the model.

29. The method of claim 28, wherein the negative entropy is minimized independent of known and hypothesized relationships between facial gestures, facial features, and the training audio signal, in order to derive a structure, parameters, and the facial states of the model.

30. The method of claim 28, wherein the entropy is minimized in order to maximize a probability that a progression from the input audio signal to the sequence of facial states to the control parameters has a minimal loss of information and is maximally consistent with behavior observed in the training audio signal.

31. The method of claim 28, wherein the negative entropy is minimized in order to maximize reproduction of long-term effects where a behavior of the face at a particular time is constrained by facial poses and facial motions that occur at earlier or later times in the facial animation.

* * * * *